(12) United States Patent
Wang et al.

(10) Patent No.: US 12,127,207 B2
(45) Date of Patent: *Oct. 22, 2024

(54) USER EQUIPMENT, BASE STATION AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP); Tomoya Nunome, Ishikawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,812

(22) Filed: Nov. 3, 2023

(65) Prior Publication Data

US 2024/0080845 A1  Mar. 7, 2024

Related U.S. Application Data

(63) Continuation of application No. 18/066,201, filed on Dec. 14, 2022, now Pat. No. 11,849,457, which is a
(Continued)

(51) Int. Cl.
*H04W 72/21* (2023.01)
*H04L 1/00* (2006.01)
(Continued)

(52) U.S. Cl.
CPC ........... *H04W 72/21* (2023.01); *H04L 1/0038* (2013.01); *H04L 1/1819* (2013.01);
(Continued)

(58) Field of Classification Search
None
See application file for complete search history.

(56) References Cited

U.S. PATENT DOCUMENTS 9,655,091 B2   5/2017   Papasakellariou et al.
9,661,619 B2   5/2017   Han et al.
(Continued)

FOREIGN PATENT DOCUMENTS

CN   103202059 A   7/2023
EP   2 622 899 A1   8/2013
(Continued)

OTHER PUBLICATIONS

English Translation of Chinese Office Action, dated Jan. 5, 2023, for related Chinese Patent Application No. 201880079707.2. (15 pages).
(Continued)

*Primary Examiner* — Steve R Young
(74) *Attorney, Agent, or Firm* — Seed IP Law Group LLP

(57) ABSTRACT

Provided are a user equipment, base station and wireless communication methods related to multiplexing of UCI in PUSCH in NR. A user equipment comprises: circuitry operative to process UCI bits to be transmitted according to the comparison of the number M of UCI bits generated based on DL assignment(s) before an UL grant from a base station and the number N of UCI bits generated based on DL assignment(s) after the UL grant with the number P of UCI bits indicated in the UL grant and/or the maximum number Q of bits determined based on at least a configured coding rate, wherein each of M, N, P, Q is an integer equal to or larger than 0; and a transmitter operative to transmit the processed UCI bits in PUSCH at a TTI indicated in the UL grant to the base station.

8 Claims, 10 Drawing Sheets

Related U.S. Application Data continuation of application No. 16/769,270, filed as application No. PCT/CN2018/071285 on Jan. 4, 2018, now Pat. No. 11,564,212.

(51) Int. Cl.
*H04L 1/1812* (2023.01)
*H04L 5/00* (2006.01)
*H04W 72/23* (2023.01)

(52) U.S. Cl.
CPC .......... *H04L 5/0055* (2013.01); *H04L 5/0082* (2013.01); *H04W 72/23* (2023.01)

(56) References Cited

U.S. PATENT DOCUMENTS

| | | | |
|---|---|---|---|
| 2013/0114391 A1 | 5/2013 | Jang et al. | |
| 2013/0265963 A1 | 10/2013 | Suzuki et al. | |
| 2014/0056273 A1 | 2/2014 | Jang et al. | |
| 2014/0078974 A1 | 3/2014 | Falahati et al. | |
| 2014/0179363 A1 | 6/2014 | Nishikawa et al. | |
| 2017/0318575 A1 | 11/2017 | Park et al. | |
| 2018/0006790 A1 | 1/2018 | Park et al. | |
| 2019/0053218 A1* | 2/2019 | Kim | H04L 1/1812 |
| 2019/0059013 A1 | 2/2019 | Rahman et al. | |
| 2019/0199477 A1 | 6/2019 | Park et al. | |
| 2020/0036501 A1 | 1/2020 | Gao et al. | |
| 2020/0287691 A1 | 9/2020 | Baldemair | |
| 2020/0296742 A1* | 9/2020 | Hao | H04B 7/0626 |
| 2020/0367265 A1 | 11/2020 | Wang et al. | |
| 2020/0404666 A1* | 12/2020 | Gao | H04W 80/08 |
| 2021/0075560 A1 | 3/2021 | Baldemair et al. | |

FOREIGN PATENT DOCUMENTS

| | | |
|---|---|---|
| JP | 5606337 B2 | 10/2014 |
| JP | 2015523831 A | 8/2015 |
| WO | 2012043346 A1 | 4/2012 |
| WO | 2012063754 A1 | 5/2012 |
| WO | 2013/024662 A1 | 2/2013 |

OTHER PUBLICATIONS

Indian Examination Report, dated Mar. 23, 2022, for related Indian Patent Application No. 202047025299 (6 pages).
International Search Report of PCT application No. PCT/CN2018/071285, dated Sep. 6, 2018. (2 pages).
MediaTek Inc., "Discussion on UCI multiplexing," R1-1718342, Agenda Item: 7.3.2.3, 3GPP TSG RAN WG1 Meeting 90bis, Prague, CZ, Oct. 9-13, 2017. (11 pages).
Indian Hearing Notice dated Aug. 6, 2024 for corresponding Indian Patent Application No. 202047025299, 3 pages.

* cited by examiner

USER EQUIPMENT, BASE STATION AND WIRELESS COMMUNICATION METHOD

BACKGROUND

1. Technical Field

The present disclosure relates to the field of wireless communication, and in particular, to a user equipment (UE), a base station (gNB) and wireless communication methods related to multiplexing of Uplink Control Information (UCI) in Physical Uplink Shared Channel (PUSCH) in NR (New Radio access technology).

2. Description of the Related Art

As well known in the art, UCI is reported by UE to a base station (BS) and can be Hybrid Automatic Repeat request-Acknowledgement (HARQ-ACK) or Channel State Information (CSI) such as Channel Quality Indicator (CQI), Rank Indication (RI) or Precoding Matrix Indicator (PMI). Also, UCI can be transmitted in Physical Uplink Control Channel (PUCCH) or PUSCH. When being transmitted in PUSCH, UCI will occupy some data channel Resource Elements (REs). Multiplexing of UCI in PUSCH is also a topic discussed in initial NR standardization phase (Release 15), but the issue has not been completely solved.

SUMMARY

One non-limiting and exemplary embodiment facilitates multiplexing of UCI in PUSCH in NR to increase the user throughput and to improve the system performance.

In a first general aspect of the present disclosure, there is provided a user equipment, comprising: circuitry operative to process Uplink Control Information (UCI) bits to be transmitted according to the comparison of the number M of UCI bits generated based on Downlink (DL) assignment(s) before an Uplink (UL) grant from a base station and the number N of UCI bits generated based on DL assignment(s) after the UL grant with the number P of UCI bits indicated in the UL grant and/or the maximum number Q of bits determined based on at least a configured coding rate, wherein each of M, N, P, Q is an integer equal to or larger than 0; and a transmitter operative to transmit the processed UCI bits in Physical Uplink Shared Channel (PUSCH) at a Transmission Time Interval (TTI) indicated in the UL grant to the base station.

In a second general aspect of the present disclosure, there is provided a base station, comprising: a receiver operative to receive Uplink Control Information (UCI) bits transmitted in Physical Uplink Shared Channel (PUSCH) at a Transmission Time Interval (TTI) indicated in an Uplink (UL) grant from a user equipment; and circuitry operative to decode the UCI bits in accordance with a UCI multiplexing rule, wherein the UCI bits before transmission is processed at the user equipment according to the comparison of the number M of UCI bits generated based on Downlink (DL) assignment(s) before the UL grant from the base station and the number N of UCI bits generated based on DL assignment(s) after the UL grant with the number P of UCI bits indicated in the UL grant and/or the maximum number Q of bits determined based on at least a configured coding rate in accordance with the UCI multiplexing rule, wherein each of M, N, P, Q is an integer equal to or larger than 0.

In a third general aspect of the present disclosure, there is provided a wireless communication method for a user equipment, comprising: processing Uplink Control Information (UCI) bits to be transmitted according to the comparison of the number M of UCI bits generated based on Downlink (DL) assignment(s) before an Uplink (UL) grant from a base station and the number N of UCI bits generated based on DL assignment(s) after the UL grant with the number P of UCI bits indicated in the UL grant and/or the maximum number Q of bits determined based on at least a configured coding rate, wherein each of M, N, P, Q is an integer equal to or larger than 0; and transmitting the processed UCI bits in Physical Uplink Shared Channel (PUSCH) at a Transmission Time Interval (TTI) indicated in the UL grant to the base station.

In a fourth general aspect of the present disclosure, there is provided a wireless communication method for a base station, comprising: receiving Uplink Control Information (UCI) bits transmitted in Physical Uplink Shared Channel (PUSCH) at a Transmission Time Interval (TTI) indicated in an Uplink (UL) grant from a user equipment; and decoding the UCI bits in accordance with a UCI multiplexing rule, wherein the UCI bits before transmission is processed at the user equipment according to the comparison of the number M of UCI bits generated based on Downlink (DL) assignment(s) before the UL grant from the base station and the number N of UCI bits generated based on DL assignment(s) after the UL grant with the number P of UCI bits indicated in the UL grant and/or the maximum number Q of bits determined based on at least a configured coding rate in accordance with the UCI multiplexing rule, wherein each of M, N, P, Q is an integer equal to or larger than 0.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
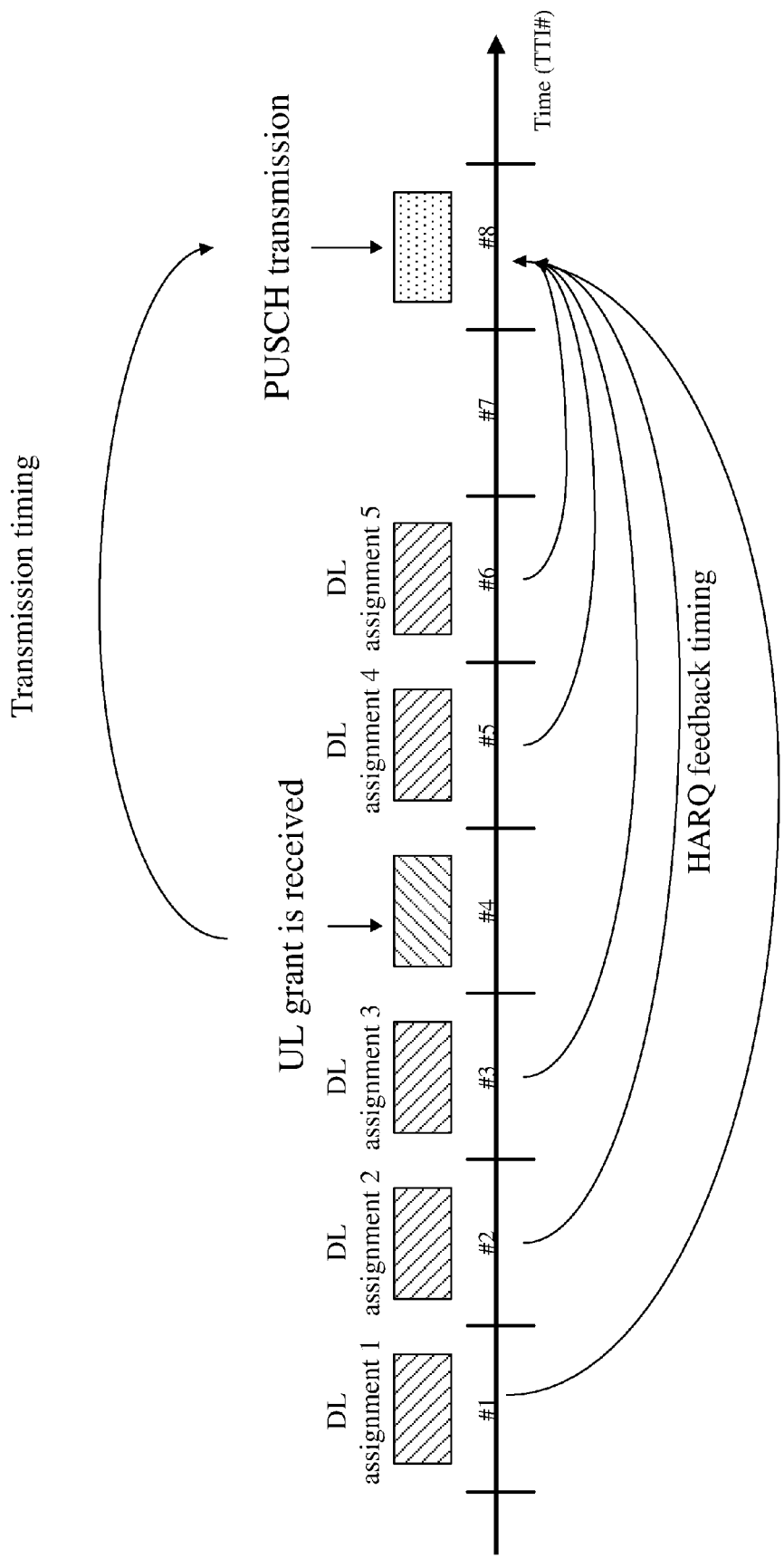
FIG. 1 schematically shows an exemplary scenario of UCI multiplexing in PUSCH in NR.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

As described hereinabove, UCI multiplexing in PUSCH has been adopted in NR (e.g. release 15). FIG. 1 schematically shows an exemplary scenario of UCI multiplexing in PUSCH in NR. In FIG. 1, an axis pointing to right represents a time axis and the numbers of Transmission Time Intervals (TTIs) are indicated thereon, blocks filled with left slashes represents Downlink (DL) assignments from a base station (gNB), a block filled with right slashes represents a UL grant from the base station, and a block filled with points represents PUSCH transmission from a UE to the base station. Here, gNB refers to a node providing NR user plane and control plane protocol terminations towards the UE, and connected via the NG interface to the 5G Core (5GC).

More specifically, as shown in FIG. 1, the UL grant is received by the UE at TTI #4 from the base station. From the indication in the UL grant, the UE can determine the transmission timing for PUSCH. For example, as shown in FIG. 1, the UL grant indicates that TTI #8 is the transmission timing for PUSCH, that is to say, UE will perform PUSCH transmission at TTI #8.

Additionally, UCI bits will also be transmitted at TTI #8 by UCI multiplexing in PUSCH. The UL grant received at TTI #4 by the UE can also indicate Downlink Assignment Indicator (DAI) which is used to calculate needed UCI resources. For ease of explanation, HARQ-ACK is taken as an example of UCI in FIG. 1. As already agreed in NR, HARQ bits for DL assignments 1-3 which are received at TTIs #1-3 before the UL grant is received will be multiplexed in PUSCH at TTI #8. In principle, the indicated number of HARQ bits by DAI can be larger or less than the number of really generated HARQ bits for example for DL assignments 1-3.

In addition, based on NR agreements, for slot-based scheduling, for HARQ-ACK with more than 2 bits, PUSCH is rate-matched; while for HARQ-ACK with up to 2 bits, PUSCH is punctured.

As shown in FIG. 1, in addition to DL assignments 1-3, there are DL assignments 4-5 which are received at TTIs #5-6 after the UL grant is received, and HARQ bits for DL assignments 4-5 may also need to be transmitted to the base station, which however will not be handed in Rel.15 NR, that is to say, how to handle them is still unclear in NR now. Furthermore, HARQ-ACK bits indicated (e.g., in term of DAI) in the UL grant may not be accurate to cover all feedback bits for DL assignments before and after the UL grant. Thus, some rule is needed to handle HARQ-ACK bits generated for DL assignments (for example, DL assignments 4 and 5) after the UL grant in NR.

Figure 2:
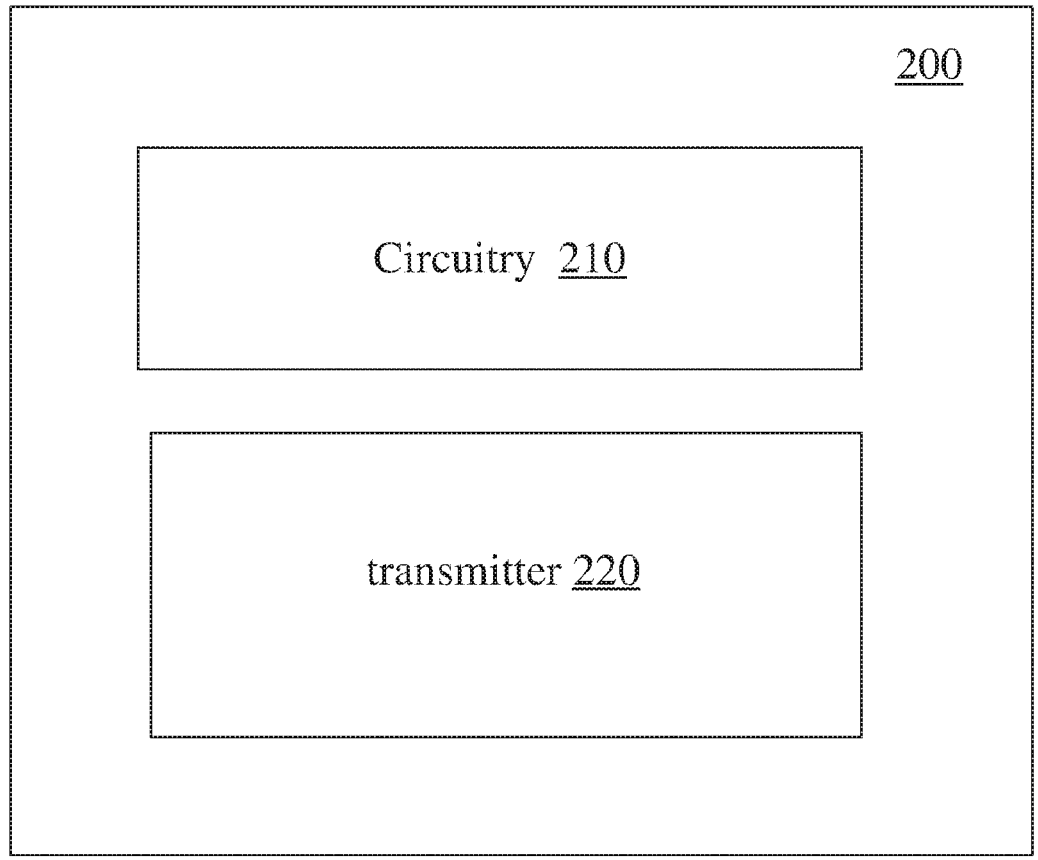
FIG. 2 illustrates a block diagram of a part of a user equipment according to an embodiment of the present disclosure.

In view of the above, in an embodiment of the present disclosure, there is provided a user equipment as shown in FIG. 2. FIG. 2 illustrates a block diagram of a part of a user equipment 200 according to an embodiment of the present disclosure. As shown in FIG. 2, the UE 200 may include circuitry 210 and a transmitter 220. The circuitry 210 is operative to process Uplink Control Information (UCI) bits to be transmitted according to the comparison of the number M of UCI bits generated based on Downlink (DL) assignment(s) before an Uplink (UL) grant from a base station and the number N of UCI bits generated based on DL assignment(s) after the UL grant with the number P of UCI bits indicated in the UL grant and/or the maximum number Q of bits determined based on at least a configured coding rate, wherein each of M, N, P, Q is an integer equal to or larger than 0. The transmitter 220 is operative to transmit the processed UCI bits in Physical Uplink Shared Channel (PUSCH) at a Transmission Time Interval (TTI) indicated in the UL grant to the base station.

Specifically, still taking FIG. 1 as an example, M may means the number of UCI bits (e.g. HARQ bits) really generated based on DL assignments 1-3, N may means the number of UCI bits (e.g. HARQ bits) really generated based on DL assignments 4-5, and P may means the number of UCI bits indicated (for example, by DAI) in the UL grant (as indicated by the block filled with right slashes in FIG. 1). Q means the maximum number of bits for UCI and may be computed based on a configured coding rate and other factors, which will be discussed in detail later.

Before transmitting UCI bits in PUSCH, the circuitry 210 process these UCI bits according to the comparison of M and N with P, the comparison of M and N with Q or the comparison of M and N with P and Q. Then, the transmitter 220 transmits the UCI bits processed by the circuitry 210 in PUSCH to the base station at for example TTI #8 in FIG. 1.

Apparently, DL assignment(s) after the UL grant means DL assignment(s) received by the UE (e.g. DL assignments 4-5) after the UL grant is received by the UE before the transmission timing of PUSCH transmission (e.g. TTI #8).

In addition, DL assignment(s) before the UL grant means DL assignment(s) received by the UE (e.g. DL assignments 1-3) before the UL grant is received by the UE. In other word, DL assignment(s) before the UL grant may correspond to DL assignment(s) received by the UE in a time window before the timing (e.g. TTI #4) of receiving the UL grant. The size of the time window may be configured dynamically by the base station via RRC signaling for example. Alternatively, the size of the time window may be predefined or specified in the standard. The size of the time window may also be unlimited. It is appreciated by those skilled in the art that the size of the time window may depend on specific requirements.

With the user equipment 200 as shown in FIG. 2, UCI bits based on DL assignment(s) after the UL grant from the base station are taken into account and are transmitted in PUSCH together with UCI bits based on DL assignment(s) before the UL grant, thus the user throughput may be increased and the system performance may be improved.

According to an embodiment of the present disclosure, in the UE 200 as shown in FIG. 2, when (M+N)≤P, the circuitry

210 multiplexes the N UCI bits with the M UCI bits together without any compression; when M<P<(M+N), the circuitry 210 bundles the N UCI bits into (N−X1) UCI bits, bundles the M UCI bits into (M−X2) UCI bits and multiplexes the (N−X1) UCI bits with the (M−X2) UCI bits together, wherein (X1+X2)=M+N−P in which both X1 and X2 are integers equal to or larger than 0; and when P≤M, the circuitry 210 bundles the N UCI bits into (N−Y1) UCI bits, bundles the M UCI bits into (M−Y2) UCI bits and multiplexes the (N−Y1) UCI bits with the (M−Y2) UCI bits together, wherein (Y1+Y2)=M+N−P in which both Y1 and Y2 are integers larger than 0.

Specifically, in this embodiment, the circuitry 210 processes UCI bits to be transmitted according to the comparison of M and N with P and it may be divided into for example three cases as follows according to the comparison of M and N with P. HARQ-ACK is still taken as an example of UCI for ease of explanation.

For case 1 in which (M+N)≤P, that is to say, there are enough resources in PUSCH to transmit both M bits of HARQ-ACK corresponding to DL assignment(s) before the UL grant and N bits of HARQ-ACK corresponding to DL assignment(s) after the UL grant, the M bits of HARQ-ACK and the N bits of HARQ-ACK may be multiplexed together without any compression. For example, assuming that the M bits of HARQ-ACK are "01" and the N bits of HARQ-ACK are "10", they may be directly multiplexed as "0110" and be transmitted in PUSCH.

For case 2 in which M<P<(M+N), that is to say, there is enough resources to transmit M bits of HARQ-ACK corresponding to DL assignment(s) before the UL grant only but not enough resources to transmit both M bits of HARQ-ACK corresponding to DL assignment(s) before the UL grant and N bits of HARQ-ACK corresponding to DL assignment(s) after the UL grant, some operation on reducing the total number "M+N" of really generated HARQ-ACK bits is necessary.

The first option for case 2 to reduce the total number "M+N" of really generated HARQ-ACK bits is to reduce the number N of HARQ-ACK bits corresponding to DL assignment(s) after the UL grant while keeping M bits of HARQ-ACK corresponding to DL assignment(s) before the UL grant unchanged. In this case, N bits of HARQ-ACK are bundled into (N−X1) bits with X1 being larger than 0 and X2 being 0. Then, the (N−X1) bits of HARQ-ACK are multiplexed with M bits of HARQ-ACK together. As well known in the art, bundling means AND operation. For example, it is assumed that M bits of HARQ-ACK are "101111" (i.e. M=6), N bits of HARQ-ACK are "0101" (i.e. N=4) and P=8, that is to say, only 8 bits can be used for transmitting HARQ-ACK in PUSCH. According to the first option for case 2, X1=M+N−P=6+4−8=2, that is to say, N bits of HARQ-ACK should be reduced by 2 bits by means of bundling. For example, "0101" are bundled into "00" in which AND operation is performed between the first bit of "0" and the second bit of "1" to obtain "0" and AND operation is performed between the third bit of "0" and the fourth bit of "1" to obtain "0". Then, "00" obtained after bundling are directly multiplexed with "101111" as "10111100".

The first option for case 2 is only an example of reducing the total number "M+N" of really generated HARQ-ACK bits and the present disclosure is not limited thereto. The second option for case 2 to reduce the total number "M+N" of really generated HARQ-ACK bits is to reduce the number M of HARQ-ACK bits corresponding to DL assignment(s) before the UL grant while keeping N bits of HARQ-ACK corresponding to DL assignment(s) after the UL grant unchanged. In this case, M bits of HARQ-ACK are bundled into (M−X2) bits with X2 being larger than 0 and X1 being 0. Then, the (M−X2) bits of HARQ-ACK are multiplexed with N bits of HARQ-ACK together. For example, it is also assumed that M bits of HARQ-ACK are "101111" (i.e. M=6), N bits of HARQ-ACK are "0101" (i.e. N=4) and P=8, that is to say, only 8 bits can be used for transmitting HARQ-ACK in PUSCH. According to the second option for case 2, X2=M+N−P=6+4−8=2, that is to say, M bits of HARQ-ACK should be reduced by 2 bits by means of bundling. For example, "101111" are bundled into "0111", in which AND operation is performed between the first bit of "1" and the second bit of "0" to obtain "0" and AND operation is performed between the third bit of "1" and the fourth bit of "1" to obtain "1". Then, "0111" obtained after bundling are directly multiplexed with "0101" as "01110101".

In addition to the above first and second options for case, there may be some middle solution between the two options. Specifically, the third option for case 2 to reduce the total number "M+N" of really generated HARQ-ACK bits is to reduce both the number N of HARQ-ACK bits corresponding to DL assignment(s) after the UL grant and the number M of HARQ-ACK bits corresponding to DL assignment(s) before the UL grant. More specifically, the N bits of HARQ-ACK are bundled into (N−X1) bits and the M bits of HARQ-ACK are bundled into (M−X2) bits in which X1+X2=M+N−P with both X1 and X2 being larger than 0. Then, the (N−X1) UCI bits are directly multiplexed with the (M−X2) UCI bits together. For example, it is also assumed that M bits of HARQ-ACK are "101111" (i.e. M=6), N bits of HARQ-ACK are "0101" (i.e. N=4) and P=8, that is to say, only 8 bits can be used for transmitting HARQ-ACK in PUSCH. According to the third option for case 2, X1+X2=6+4−8=2, so that X1=X2=1. "101111" may be bundled into "01111" in which AND operation is performed between the first bit of "0" and the second bit of "1" to obtain "0". And, "0101" may be bundled into "001" in which AND operation is performed between the first bit of "0" and the second bit of "1" to obtain "0". Then "01111" and "001" obtained after bundling respectively may be directly multiplexed as "01111001".

For case 3 in which P≤M, that is to say, there is not enough resources to transmit both M bits of HARQ-ACK corresponding to DL assignment(s) before the UL grant and N bits of HARQ-ACK corresponding to DL assignment(s) after the UL grant when N is larger than 0. In this case, like the third option for case 2 as described above, both the number N of HARQ-ACK bits corresponding to DL assignment(s) after the UL grant and the number M of HARQ-ACK bits corresponding to DL assignment(s) before the UL grant need to be reduced by means of bundling. More specifically, the N bits of HARQ-ACK are bundled into (N−Y1) bits, and the M bits of HARQ-ACK are bundled into (M−Y2) bits. Then, the (N−Y1) bits and the (M−Y2) bits are directly multiplexed together in which Y1+Y2=M+N−P with both Y1 and Y2 being larger than 0. Since the operation principle in this case is similar with that in the third option for case 2, no further examples will be discussed here for avoiding redundancy.

It is noted that the above case 3 may happen based on network operation. Further bundling of M UCI bits could be operated to fulfill the resources and maximum coding rate.

In the above embodiment, the circuitry 210 process UCI bits according to the comparison of M and N with P, however, the present disclosure is not limited thereto.

According to an embodiment of the present disclosure, in the UE 200 as shown in FIG. 2, when $(M+N) \leq Q$, the circuitry 210 multiplexes the N UCI bits with the M UCI bits together without any compression; and when $Q<(M+N)$, the circuitry 210 bundles the N UCI bits into $(N-Z1)$ UCI bits, bundles the M UCI bits into $(M-Z2)$ UCI bits and multiplexes the $(N-Z1)$ UCI bits with the $(M-Z2)$ UCI bits together, wherein $(Z1+Z2) \geq M+N-Q$ in which both Z1 and Z2 are integers equal to or larger than 0.

Specifically, in this embodiment, the circuitry 210 processes UCI bits to be transmitted according to the comparison of M and N with Q instead of P and it may be divided into for example two cases as follows according to the comparison of M and N with Q. HARQ-ACK is still taken as an example of UCI for ease of explanation.

For case 1 in which $(M+N) \leq Q$, that is to say, there are enough resource to transmit both M bits of HARQ-ACK corresponding to DL assignment(s) before the UL grant and N bits of HARQ-ACK corresponding to DL assignment(s) after the UL grant, the M bits of HARQ-ACK and the N bits of HARQ-ACK may be multiplexed together without any compression. This case is similar with case 1 for the previous embodiment and no further example will be discussed here for avoiding redundancy.

For case 2 in which $Q<(M+N)$, that is to say, there is not enough resources to transmit both M bits of HARQ-ACK corresponding to DL assignment(s) before the UL grant and N bits of HARQ-ACK corresponding to DL assignment(s) after the UL grant, the total number "M+N" of really generated HARQ-ACK bits need to be reduced to be not larger than Q. Thus, based on the value of Q, one of or both the number N of HARQ-ACK bits corresponding to DL assignment(s) after the UL grant and the number M of HARQ-ACK bits corresponding to DL assignment(s) before the UL grant need to be reduced by means of bundling. More specifically, the N bits of HARQ-ACK are bundled into $(N-Z1)$ bits, and the M bits of HARQ-ACK are bundled into $(M-Z2)$ bits. Then, the $(N-Z1)$ bits and the $(M-Z2)$ bits are directly multiplexed together in which $Z1+Z2 \geq M+N-Q$ with both Z1 and Z2 being equal to or larger than 0. This case is similar with the combination of case 2 and case 3 for the previous embodiment of comparing M and N with P. Since the operation principle in this case is similar with those in case 2 and case 3 for the previous embodiment, no further examples will be discussed here for avoiding redundancy.

Generally, the number P of UCI bits indicated in the UL grant is less than the maximum number Q of bits determined based on a configured coding rate. This embodiment of processing UCI bits according to the comparison of M and N with Q instead of P may correspond to a case that the resource utilization is poor.

According to an embodiment of the present disclosure, the configured coding rate is the maximum coding rate of the UCI bits, and Q is determined based on the maximum coding rate of the UCI bits, an assumed resource size and an assumed modulation order.

Specifically, the computation of Q may be based on the three factors, i.e. the maximum coding rate, the assumed resource size and the assumed modulation order.

More specifically, according to an embodiment of the present disclosure, the assumed resource size is the whole assigned PUSCH resource excluding Resource Elements (REs) for Reference Signals (RSs), is determined based on the indication in Downlink Control Information for UL assignment and semi-static configuration, or is determined based on semi-static configuration only.

In addition, according to an embodiment of the present disclosure, the assumed modulation order is the same as that of PUSCH.

For convenience of understanding, several examples will be given in the following to explain the computation of Q.

As described above, option 1 for the assumed resource size is the whole assigned PUSCH resource excluding RS REs. One example is that a gNB (base station) allocates 6 Physical Resource Blocks (PRBs) and each PRB has 120 REs (excluding RS REs), so there are totally $6 \times 120=720$ REs. Assuming the maximum coding rate is 0.1 and the modulation order is 16QAM (same as that of PUSCH), the supported maximum number Q of bits are $720 \times 0.1 \times 4=288$ bits in this case.

As described above, option 2 for the assumed resource size is based on the indication in Downlink Control Information (DCI) for UL assignment and semi-static configuration (for example, Radio Resource Control (RRC)), which is for example same as a case that beta factor offset field is available in DCI. More specifically, one resource size (index) is selected by DCI from a range of resource sizes (indexes) given by RRC. For example, assuming the assigned PUSCH is 720 REs (6 PRBs), beta factor offset is configured as $\{0.1, 0.2, 0.5, 1.0\}$ by RRC and DCI indicates the first index (0.1) therefrom, so assumed resource size is $720 \times 0.1 = 72$. Based on the same assumption on coding rate (0.1) and modulation order (16QAM) in option 1, the supported maximum number Q of bits are $720 \times 0.1 \times 0.1 \times 4=29$ bits in this case.

As described above, option 3 for the assumed resource size is based on semi-static configuration (for example, RRC) only, which is for example same as fallback DCI case of resource determination. More specifically, in this case, the resource size is determined by RRC only without indication from DCI. For example, beta value is only indicated by RRC as for example 0.1 and there is no additional indication from DCI. Based on the same assumption on assigned PUSCH (720 REs), maximum coding rate (0.1) and modulation order (16QAM) in option 2, the supported maximum number Q of bits are $720 \times 0.1 \times 0.1 \times 4=29$ bits in this case.

According to an embodiment of the present disclosure, the maximum coding rate of the UCI bits is separately configured for UCI multiplexing of PUSCH and that of Physical Uplink Control Channel (PUCCH) but Radio Resource Control (RRC) parameter set is common for PUSCH and PUCCH.

Specifically, taking HARQ-ACK as an example of UCI, the maximum coding rate of HARQ-ACK bits is separately configured for UCI multiplexing of PUSCH and that of PUCCH but the RRC parameter set used for UCI multiplexing of PUCCH could be re-used for UCI multiplexing of PUSCH. For example, the RRC parameter set on coding rate $\{0.1, 0.2, 0.3, 0.4\}$ can be common for PUSCH and PUCCH but 0.1 in the set can be configured for PUSCH while 0.2 in the set may be configured for PUCCH.

In the above embodiments, the circuitry 210 process UCI bits according to the comparison of M and N with P or the comparison of M and N with Q, however, the present disclosure is not limited thereto.

According to an embodiment of the present disclosure, in the UE 200 as shown in FIG. 2, when $P<(M+N) \leq Q$, the circuitry 210 multiplexes the N UCI bits with the M UCI bits together without any compression.

Specifically, in this embodiment, UCI bits are processed based on all of M, N, P and Q. As described above, generally, P is less than Q. Thus, apparently, when $(M+N) \leq P$ meaning that the indicated "P" is enough to carry all of UCI bits, N UCI bits and M UCI bits may be directly multiplexed together in PUSCH without any compression as in case 1 of the embodiment in which the circuitry 210 processes UCI bits to be transmitted according to the comparison of M and N with P. The details thereof will not be discussed here for avoiding redundancy.

Different from case 2 and case 3 of the embodiment in which the circuitry 210 processes UCI bits to be transmitted according to the comparison of M and N with P, in the present embodiment, when P<(M+N) meaning that the indicated "P" is not enough to carry all of UCI bits, it is not necessary to perform bundling on N UCI bits and/or M UCI bits; instead, further comparison of M and N with Q is to be performed, and when (M+N)≤Q, N UCI bits and the M UCI bits are directly multiplexed together without any compression.

In the present embodiment, the UE may utilize the additional resources (bits) gained from the maximum coding rate. Thereby, the accuracy of decoding of UCI bits at the base station may be improved.

According to an embodiment of the present disclosure, in the UE 200 as shown in FIG. 2, the UCI bits are used for a first UCI, and when a transmitted coding rate of the first UCI considering DL assignment(s) after the UL grant minus a transmitted coding rate of the first UCI not considering DL assignment(s) after the UL grant is higher than a predetermined value, the circuitry 210 pre-empts resources used for a second UCI of a priority lower than that of the first UCI in PUSCH to provide additional bits for the first UCI.

Specifically, a transmitted coding rate of the first UCI considering DL assignment(s) after the UL grant minus a transmitted coding rate of the first UCI not considering DL assignment(s) after the UL grant being higher than a predetermined value means that there is no enough resources in PUSCH to transmit both UCI bits corresponding to DL assignment(s) before the UL grant and UCI bits corresponding to DL assignment(s) after the UL grant for the first UCI when further taking UCI bits corresponding to DL assignment(s) after the UL grant for the first UCI into account. In addition to bundling some of UCI bits for the first UCI itself like in the above embodiments, the another option is to pre-empt resources used for other UCI than the first UCI with the other UCI having a priority lower than that of the first UCI. That is to say, resources intended for a UCI of lower priority in PUSCH is pre-empted to provide additional resources (bits) for a UCI of higher priority so that it is assured that UCI bits for the UCI of a higher priority will not be compressed.

According to an embodiment of the present disclosure, the first UCI is Hybrid Automatic Repeat request-Acknowledgement (HARQ-ACK) and the second UCI is Channel State Information (CSI).

Specifically, it is assumed that the first UCI is HARQ-ACK and the second UCI is CSI. Since the priority of HARQ-ACK is higher than the priority of CSI, resources intended for CSI in PUSCH may be pre-empted to be used for HARQ-ACK bits.

It is noted that HARQ-ACK and CSI are only exemplary, and the present disclosure is not limited thereto. The first UCI and the second UCI may be any other suitable kinds of UCI depending on specific circumstances.

According to an embodiment of the present disclosure, the predetermined value is configured or specified in the standard.

Specifically, the predetermined value is a threshold which determines whether resources used for a second UCI of a priority lower than that of the first UCI in PUSCH needs to be pre-empted to provide additional bits for the first UCI. The predetermined value may be configured by the base station via for example RRC signaling, or may be specified in the standard.

According to an embodiment of the present disclosure, in the UE 200 as shown in FIG. 2, the circuitry 210 pre-empts resources used for the second UCI in PUSCH by bundling and/or dropping the second UCI. And dropping the second UCI comprising one of: dropping some REs for the second UCI without changing the coding rate of the second UCI; changing the coding rate of the second UCI to leave some REs to be used for the first UCI; and dropping all of REs for the second UCI.

Specifically, for convenience of understanding, HARQ-ACK and CSI are still taken as examples of the first UCI and the second UCI respectively. In order to pre-empt resources used for CSI in PUSCH, bundling may be performed on CSI bits. Since the principle of bundling on CSI bits is similar with that on HARQ-ACK bits as described above, details thereof will not be discussed here for avoiding redundancy. In addition to bundling, dropping CSI is alternative.

More specifically, dropping CSI may be implemented by dropping some REs for CSI in PUSCH while keeping the coding rate of CSI unchanged so that the some REs may be provided as additional resources for transmitting HARQ-ACK. Alternatively, dropping CSI may be implemented by changing the coding rate of CSI to leave some REs to be used for HARQ-ACK. Or, even all of REs for CSI may be dropped so that all of these REs can be provided as additional resources for transmitting HARQ-ACK.

Furthermore, resources used for CSI in PUSCH may be pre-empted by the combination of bundling CSI bits and dropping CSI REs.

It is noted that the above implementations of pre-empting resources used for the second UCI are only exemplary, and pre-empting resources used for the second UCI may be implemented by any other suitable manners depending on specific circumstances.

According to an embodiment of the present disclosure, the bundling is performed in spatial domain first and then in frequency domain and finally in time domain, or performed in spatial domain first and then in time domain and finally in frequency domain, which is based on RRC configuration or specified in the standard.

Specifically, DL assignments may be distributed in difference carriers, TTIs or beams. Whether bundling on HARQ-ACK or CSI as described above, the bundling rule may need to be determined for spatial domain, frequency/carrier/BWP (Bandwidth part) domain, and time domain (for DL assignments before and after the UL grant). For example, the bundling rule may indicate that the bundling is performed in spatial domain first and then in frequency domain and finally in time domain. Alternatively, the bundling rule may indicate that the bundling is performed in spatial domain first and then in time domain and finally in frequency domain. It is noted that the present disclosure is not limited thereto, and the bundling rule may be different from the above examples depending on specific circumstances.

Furthermore, the bundling rule may be configured dynamically by the base station via for example RRC signaling. That is to say, the bundling rule may be configured by the base station via a RRC signaling initially to indicate that the bundling is performed in spatial domain first and then in frequency domain and finally in time domain for example. Afterwards, the bundling rule may be further configured by the base station via another RRC signaling to indicate that the bundling is performed in spatial domain first and then in time domain and finally in frequency domain for example.

Alternatively, the bundling rule may be specified in the standard and will not be changed dynamically. That is to say, the bundling rule may be specified in the standard to indicate that the bundling is performed in spatial domain first and then in frequency domain and finally in time domain for example and will never be changed. Or, the bundling rule may be specified in the standard to indicate that the bundling is performed in spatial domain first and then in time domain and finally in frequency domain for example and will never be changed.

According to an embodiment of the present disclosure, the UCI bits are used for one of HARQ-ACK, CSI part 1 and CSI part 2, and the coding rate for each of HARQ-ACK, CSI part 1 and CSI part 2 is separately configured.

Specifically, cases of taking HARQ-ACK as an example of UCI have been described in the above. It is noted that HARQ-ACK for DL Semi-Persistent Scheduling (SPS) may also be counted. That is to say, HARQ-ACK may include both HARQ-ACK for DL SPS and HARQ-ACK for dynamic data.

Furthermore, although examples of HARQ-ACK only are given in the above, the present disclosure is not limited thereto. The UCI bits may also be used to CSI part 1 or CSI part 2. As well known in the art, in NR, CSI part 1 is CSI like RI, Layer Indicator and Wideband CQI, while CSI part 2 is CSI like P≤M, and the size of CSI part 2 depends on CSI part 1.

More specifically, when the UCI bits are used for CSI, CSI reporting after PUSCH assignment (when based on DL assignment) uses similar mechanism as for HARQ-ACK. For example, when the number of CSI bits generated after UL grant (A) and the number of CSI bits generated before UL grant (B) exceed the limitation by maximum coding rate, some bundling operation to reduce "A+B" bits is needed.

It is noted that when there are more than one kind of UCI to be transmitted in PUSCH, UCI bits for each kind of UCI are processed separately. The coding rate for each kind of UCI like HARQ-ACK, CSI part 1 and CSI part 2 can be separately configured. For example, HARQ-ACK bits are processed by the circuitry 210 in the UE 200 as shown in FIG. 2 according to the comparison of M, N with P and/or Q specific to HARQ-ACK. Bits for CSI part 1 are processed by the circuitry 210 in the UE 200 as shown in FIG. 2 according to the comparison of M, N with P and/or Q specific to CSI part 1. Bits for CSI part 2 are processed by the circuitry 210 in the UE 200 as shown in FIG. 2 according to the comparison of M, N with P and/or Q specific to CSI part 2.

In addition, in the above examples as shown in FIG. 1 for example, UCI (e.g. HARQ-ACK) bits are generated based on DL assignments before and after the UL grant is received by the UE, however, the present disclosure is not limited thereto. It is possible that there is only Physical Downlink Shared Channel (PDSCH) (for example, Semi-Persistent Scheduling (SPS)) but no DL assignment. In this case, HARQ-ACK bits will be generated based on PDSCH and also need to be fed back to the base station. Thus, the M bits of UCI (e.g. HARQ-ACK) may be generated based on PDSCH before the UL grant is received by the UE and the N bits of UCI (e.g. HARQ-ACK) may be generated based on PDSCH after the UL grant is received by the UE.

Figure 3:
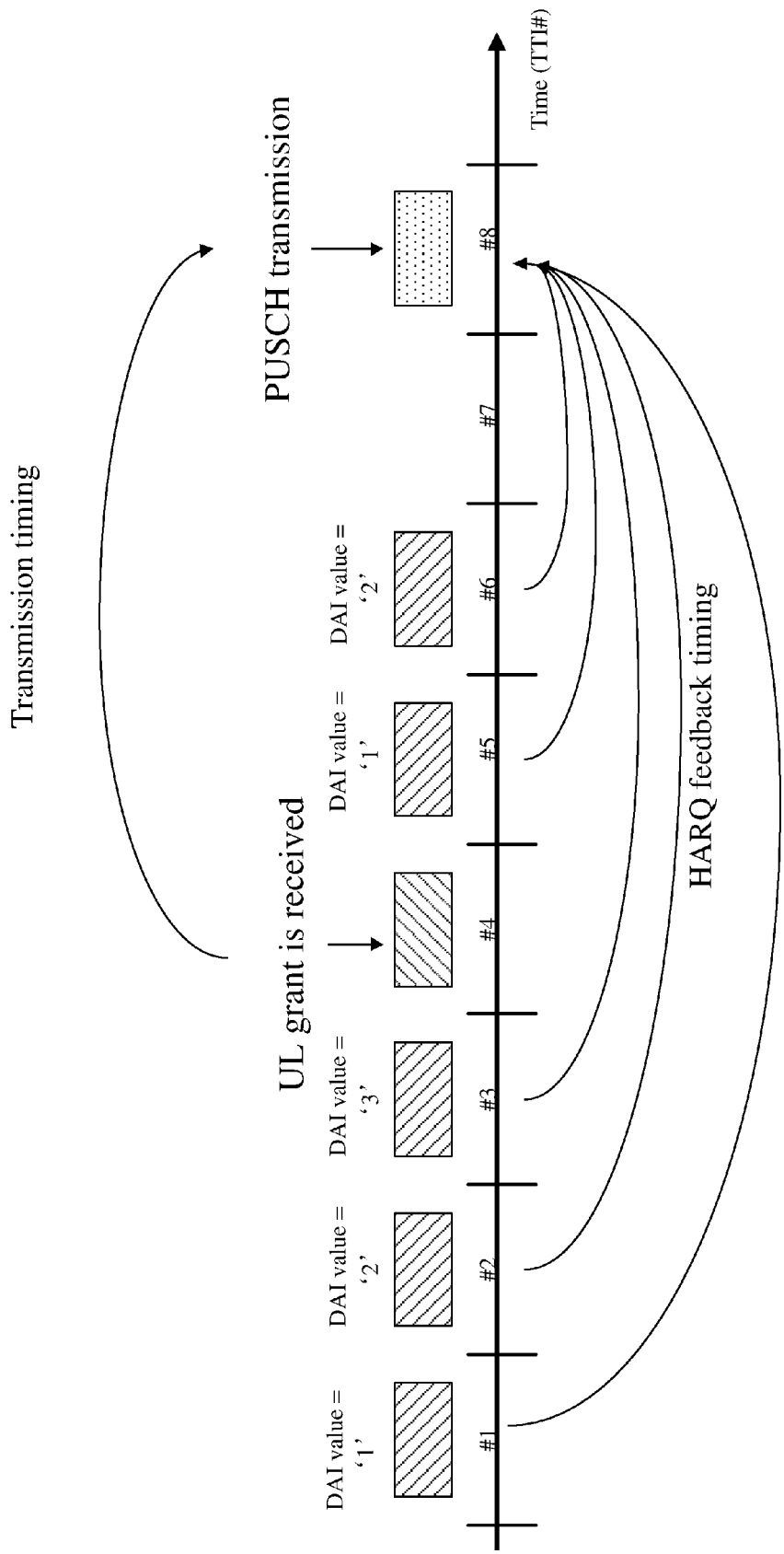
FIG. 3 schematically shows one option for counting Downlink Assignment Indicator (DAI) in UL grant from a base station in NR.
Figure 4:
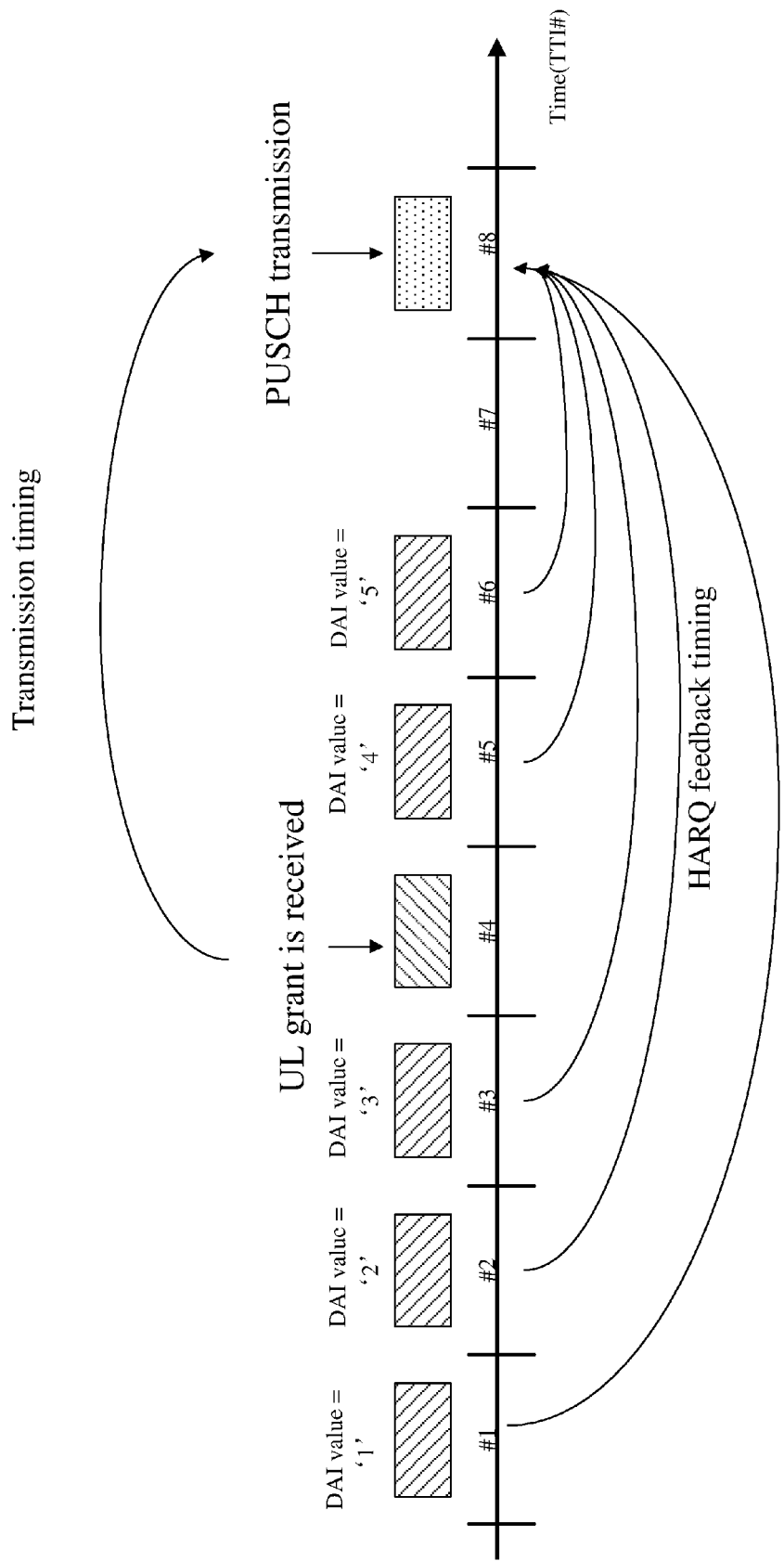
FIG. 4 schematically shows another option for counting DAI in UL grant from a base station in NR.

In addition, regarding how to count DAI in the UL grant, there may be two options as shown in FIG. 3 and FIG. 4.

FIG. 3 schematically shows one option for counting DAI in UL grant from a base station in NR. Similarly with FIG. 1, in FIG. 3, an axis pointing to right represents a time axis and the numbers of TTIs are indicated thereon, a block filled with right slashes represents a UL grant received at TTI #4 from a base station (gNB), three blocks filled with left slashes at TTI #1-3 represent DL assignments received from the base station before the UL grant respectively, two blocks filled with left slashes at TTI #5-6 represent DL assignments received from the base station after the UL grant respectively, and a block filled with points represents PUSCH transmission from a UE to the base station. From the indication in the UL grant, the UE can determine the transmission timing for PUSCH, for example, TTI #8.

As described above, the UL grant received at TTI #4 by the UE can also indicate DAI which is used to calculate needed UCI resources. As shown in FIG. 3, for the DL assignment received at TTI #1, DAI value=1; for the DL assignment received at TTI #2, DAI value is incremented to 2; and for the DL assignment received at TTI #3, DAI value is incremented to 3. However, for the DL assignment received at TTI #5, DAI value is reset to 1; and for the DL assignment received at TTI #6, DAI value is incremented to 2. That is to say, the option shown in FIG. 3 is to count DL assignments before the UL grant only without counting DL assignments after the UL grant together.

FIG. 4 schematically shows another option for counting DAI in UL grant from a base station in NR. FIG. 4 is same as FIG. 3 except the counting manner of DAI, and thus the same parts therein will not be described for avoiding redundancy. As shown in FIG. 4, for the DL assignment received at TTI #1, DAI value=1; for the DL assignment received at TTI #2, DAI value is incremented to 2; for the DL assignment received at TTI #3, DAI value is incremented to 3; for the DL assignment received at TTI #5, DAI value continues to be incremented to 4; and for the DL assignment received at TTI #6, DAI value is incremented to 5. That is to say, the option shown in FIG. 4 is to count both DL assignments before the UL grant and DL assignments after the UL grant together.

It is noted that counting of DAI as described above with reference to FIG. 3 and FIG. 4 is only exemplary, and the present disclosure is not limited thereto. Those skilled in the art may employ either of the above DAI counting manners or even any other suitable DAI counting manners depending on specific circumstances.

In the above, the UE 200 is described in detail with reference to FIGS. 1-4. With the UE 200, by further multiplexing of UCI bits corresponding to DL assignment(s) after the UL grant in PUSCH, the user throughput may be increased and the system performance may be improved.

Figure 5:
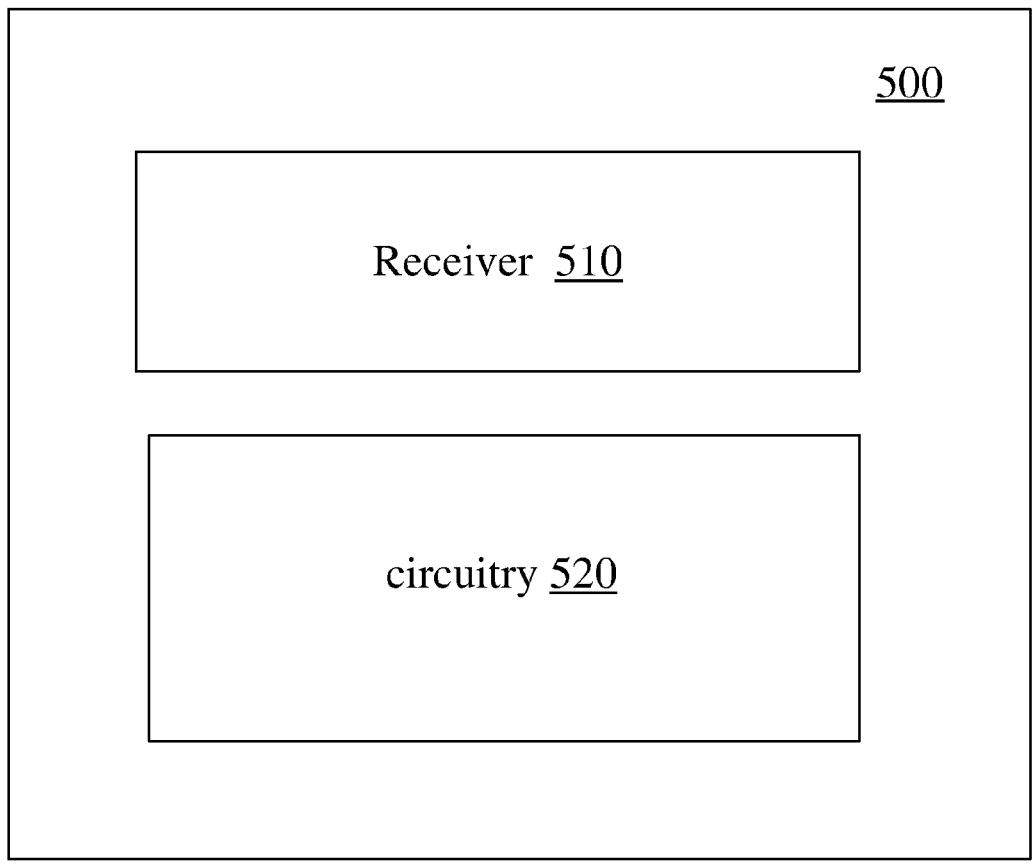
FIG. 5 illustrates a block diagram of a part of a base station according to an embodiment of the present disclosure.

In another embodiment of the present disclosure, there is provided a base station as shown in FIG. 5. FIG. 5 illustrates a block diagram of a part of a base station 500 according to an embodiment of the present disclosure. As shown in FIG. 5, BS 500 may comprise a receiver 510 and circuitry 520. The receiver 510 is operative to receive Uplink Control Information (UCI) bits transmitted in Physical Uplink Shared Channel (PUSCH) at a Transmission Time Interval (TTI) indicated in an Uplink (UL) grant from a user equipment. The circuitry 520 is operative to decode the UCI bits in accordance with a UCI multiplexing rule. The UCI bits before transmission is processed at the user equipment according to the comparison of the number M of UCI bits generated based on Downlink (DL) assignment(s) before the UL grant from the base station and the number N of UCI bits generated based on DL assignment(s) after the UL grant with the number P of UCI bits indicated in the UL grant and/or the maximum number Q of bits determined based on at least a configured coding rate in accordance with the UCI multiplexing rule, wherein each of M, N, P, Q is an integer equal to or larger than 0. For example, the user equipment may be the UE 200 as shown in FIG. 2.

According to an embodiment of the present disclosure, in accordance with the UCI multiplexing rule, when (M+N)≤P, the N UCI bits are multiplexed with the M UCI bits together without any compression at the user equipment; when M<P<(M+N), the N UCI bits are bundled into (N−X1) UCI bits, the M UCI bits are bundled into (M−X2) UCI bits and the (N−X1) UCI bits are multiplexed with the (M−X2) UCI bits together at the user equipment, wherein (X1+X2)=M+N−P in which both X1 and X2 are integers equal to or larger than 0; and when P≤M, the N UCI bits are bundled into (N−Y1) UCI bits, the M UCI bits are bundled into (M−Y2) UCI bits and the (N−Y1) UCI bits are multiplexed with the (M−Y2) UCI bits together at the user equipment, wherein (Y1+Y2)=M+N−P in which both Y1 and Y2 are integers larger than 0.

According to an embodiment of the present disclosure, in accordance with the UCI multiplexing rule, when (M+N)≤Q, the N UCI bits are multiplexed with the M UCI bits together without any compression at the user equipment; and when Q<(M+N), the N UCI bits are bundled into (N−Z1) UCI bits, the M UCI bits are bundled into (M−Z2) UCI bits and the (N−Z1) UCI bits are multiplexed with the (M−Z2) UCI bits together at the user equipment, wherein (Z1+Z2)≥M+N−Q in which both Z1 and Z2 are integers equal to or larger than 0.

According to an embodiment of the present disclosure, the configured coding rate is the maximum coding rate of the UCI bits, and Q is determined based on the maximum coding rate of the UCI bits, an assumed resource size and an assumed modulation order.

According to an embodiment of the present disclosure, the assumed resource size is the whole assigned PUSCH resource excluding Resource Elements (REs) for Reference Signals (RSs), is determined based on the indication in Downlink Control Information for UL assignment and semi-static configuration, or is determined based on semi-static configuration only.

According to an embodiment of the present disclosure, the maximum coding rate of the UCI bits is separately configured for UCI multiplexing of PUSCH and that of Physical Uplink Control Channel (PUCCH) but Radio Resource Control (RRC) parameter set is common for PUSCH and PUCCH.

According to an embodiment of the present disclosure, the assumed modulation order is the same as that of PUSCH.

According to an embodiment of the present disclosure, when P<(M+N)≤Q, the N UCI bits are multiplexed with the M UCI bits together without any compression at the user equipment in accordance with the UCI multiplexing rule.

According to an embodiment of the present disclosure, the UCI bits are used for a first UCI, and when a transmitted coding rate of the first UCI considering DL assignment(s) after the UL grant minus a transmitted coding rate of the first UCI not considering DL assignment(s) after the UL grant is higher than a predetermined value, resources used for a second UCI of a priority lower than that of the first UCI in PUSCH are pre-empted to provide additional bits for the first UCI at the user equipment in accordance with the UCI multiplexing rule.

According to an embodiment of the present disclosure, resources used for the second UCI in PUSCH are pre-empted at the user equipment by bundling and/or dropping the second UCI in accordance with the UCI multiplexing rule. And, dropping the second UCI comprising one of: dropping some REs for the second UCI without changing the coding rate of the second UCI; changing the coding rate of the second UCI to leave some REs to be used for the first UCI; and dropping all of REs for the second UCI.

According to an embodiment of the present disclosure, the predetermined value is configured or specified in the standard.

According to an embodiment of the present disclosure, the first UCI is Hybrid Automatic Repeat request-Acknowledgement (HARQ-ACK) and the second UCI is Channel State Information (CSI).

According to an embodiment of the present disclosure, the bundling is performed in spatial domain first and then in frequency domain and finally in time domain, or performed in spatial domain first and then in time domain and finally in frequency domain, which is based on RRC configuration or specified in the standard.

According to an embodiment of the present disclosure, the UCI bits are used for one of HARQ-ACK, CSI part 1 and CSI part 2, and the coding rate for each of HARQ-ACK, CSI part 1 and CSI part 2 is separately configured.

With the BS 500, by further multiplexing of UCI bits corresponding to DL assignment(s) after the UL grant in PUSCH, the user throughput may be increased and the system performance may be improved.

Figure 6:
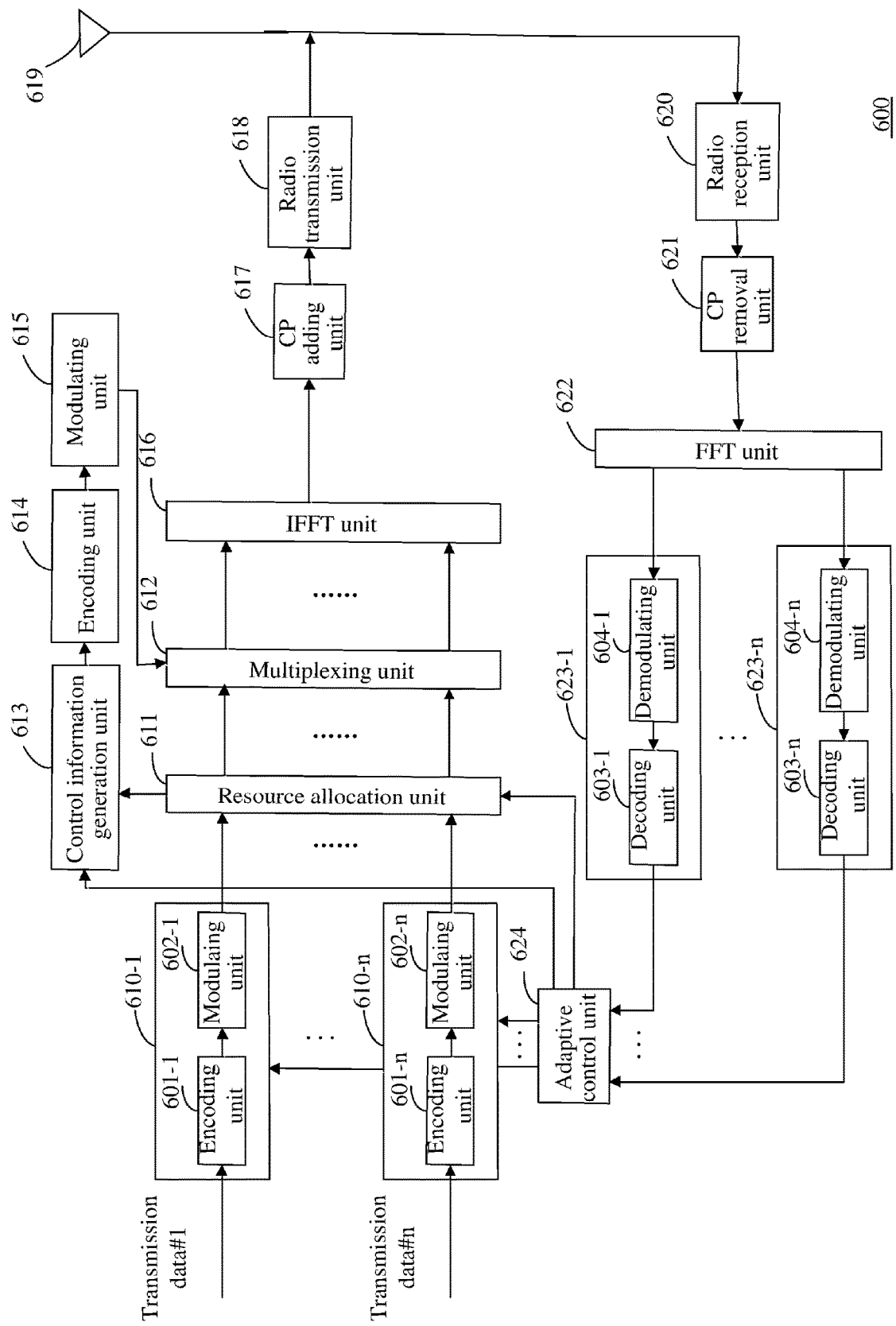
FIG. 6 illustrates a block diagram of details of a user equipment according to an embodiment of the present disclosure.

FIG. 6 illustrates a block diagram of details of a user equipment 600 according to an embodiment of the present disclosure.

The user equipment 600 is equipped with n encoding and modulating sections 610-1 through 610-n, each comprising an encoding unit 601 (601-1 through 601-n) and a modulating unit 602 (602-1 through 602-n), for transmission data #1 through transmission data #n. In the encoding and modulating sections 610-1 through 610-n, the encoding units 601-1 through 601-n perform encoding processing on transmission data #1 through #n respectively, and the modulating units 602-1 through 602-n perform modulation processing on post-encoding transmission data to generate a data symbol respectively. The coding rate and modulation scheme used at this time may be in accordance with MCS (Modulation and Coding Scheme) information input from an adaptive control unit 624. The n encoding and modulating sections 610-1 through 610-n may be considered as PUSCH.

A resource allocation unit 611 allocates the data symbol to PRB s in accordance with control from the adaptive control unit 624, and performs output to a multiplexing unit 612. The resource allocation unit 611 may also outputs resource allocation information to a control information generation unit 613.

The control information generation unit 613 generates control information comprising UCI and decides how to process UCI bits to be transmitted based on the information input from the adaptive control unit 624 and the resource allocation unit 611. More specifically, the control information generation unit 613 decides how to process UCI bits to be transmitted according to the comparison of M and N with P and/or Q as described above. Then, the control information generation unit 613 outputs the generated control information to an encoding unit 614.

The encoding unit 614 performs encoding processing on the control information (for example, UCI), and a modulating unit 615 performs modulation processing on the post-encoding control information and outputs the control information to a multiplexing unit 612.

The multiplexing unit 612 multiplexes control information (for example, UCI) with data symbols input from the resource allocation unit 611, and outputs the resulting signals to an IFFT (Inverse Fast Fourier Transform) unit 616. Control information multiplexing is performed on a subframe-by-subframe basis, for example. It is noted that, either time domain multiplexing or frequency domain multiplexing may be used for control information multiplexing.

The IFFT unit 616 performs IFFT processing on a plurality of subcarriers in the PRBs to which control information and a data symbol are mapped, to generate an OFDM (Orthogonal Frequency Division Multiplexing) symbol that is a multicarrier signal. A CP (Cyclic Prefix) adding unit 617 adds a signal identical to the end part of an OFDM symbol to the start of the OFDM symbol as a CP. A radio transmission unit 618 performs transmission processing such as D/A conversion, amplification, and up-conversion on a post-CP-addition OFDM symbol, and transmits it to a base station from an antenna 619.

Meanwhile, a radio reception unit 620 receives n OFDM symbols transmitted from a base station via the antenna 619, and performs reception processing such as down-conversion and A/D conversion on these OFDM symbols. A CP removal unit 621 removes a CP from a post-reception-processing OFDM symbol.

An FFT (Fast Fourier Transform) unit 622 performs FFT processing on a post-CP-removal OFDM symbol, to obtain signals multiplexed in the frequency domain.

In demodulating and decoding sections 623-1 through 623-n, demodulating units 604-1 through 604-n perform demodulation processing on a post-FFT signal respectively, and decoding units 603-1 through 603-n perform decoding processing on a post-demodulation signal respectively. By this means, received data is obtained. Received control information (for example, DCI) within the received data is input to the adaptive control unit 624, which performs adaptive control on transmission data based on received control information and performs frequency scheduling that decides for the resource allocation unit 611 to which PRB each data is allocated. More specifically, UE 600 may receive DL assignment(s) and UL grant (as shown in FIG. 1 for example) from the base station. After being demodulated and decoded by the demodulating and decoding sections 623-1 through 623-n, DL assignment(s) may be provided to the adaptive control unit 624 and then to the control information generation unit 613 in order to generate UCI for example.

Note that, the user equipment 600 shown in FIG. 6 may function as UE 200 as shown in FIG. 2. Specifically, the radio transmission unit 618 may correspond to the transmitter 220. The circuitry 210 may include the encoding and modulating sections 610-1 through 610-n, the resource allocation unit 611, the multiplexing unit 612, the control information generation unit 613, the encoding unit 614, the modulating unit 615, the IFFT unit 616, the CP adding unit 617, the CP removal unit 621, the FFT unit 622, the demodulating and decoding sections 623-1 through 623-n and the adaptive control unit 624. Apparently, one or more of these units may also be separated from the circuitry 210 depending on specific requirements.

Figure 7:
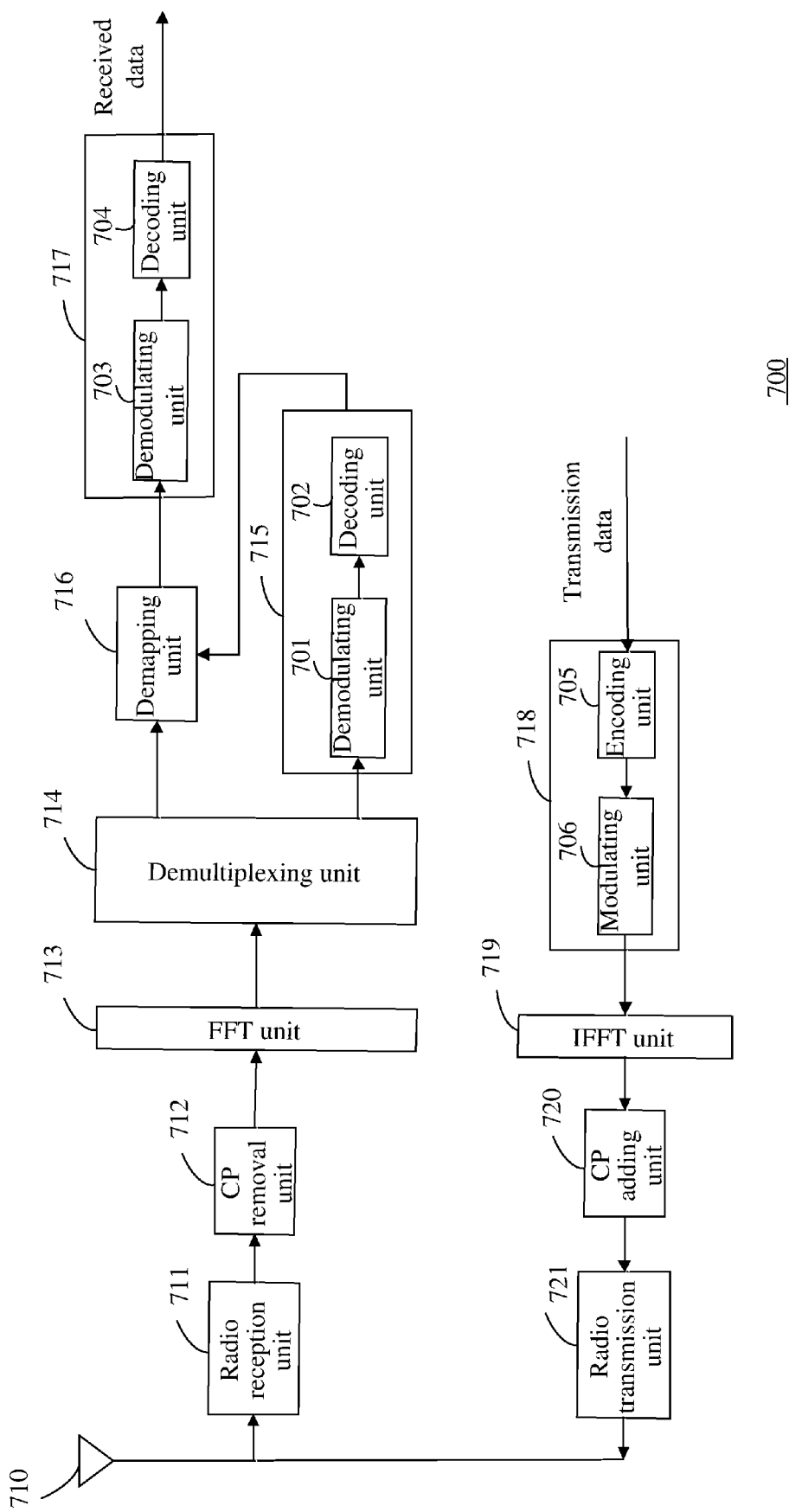
FIG. 7 illustrates a block diagram of details of a base station according to an embodiment of the present disclosure.

FIG. 7 illustrates a block diagram of details of a base station 700 according to an embodiment of the present disclosure.

In the base station 700 as shown in FIG. 7, a radio reception unit 711 receives an OFDM symbol transmitted from a user equipment via an antenna 710, and performs reception processing such as up-conversion and A/D conversion on the OFDM symbol. A CP removal unit 712 removes a CP from a post-reception-processing OFDM symbol. An FFT unit 713 performs FFT processing on a post-CP-removal OFDM symbol, to obtain a received signal in which control information (including UCI) and a data symbol are multiplexed. A demultiplexing unit 714 demultiplexes a post-FFT received signal into a control signal and data symbol. Then, the demultiplexing unit 714 outputs the control signal to a demodulating and decoding section 715, and outputs the data symbol to a demapping unit 716.

In the demodulating and decoding section 715, a demodulating unit 701 performs demodulation processing on the control signal, and a decoding unit 702 performs decoding processing on the post-demodulation signal. Here, control information may include UCI. As described above, the demodulating and decoding section 715 may demodulate and decode UCI bits in accordance a UCI multiplexing rule, which may be configured by the BS 700 in advance and be notified to the user equipment or may be specified in the standard. At the user equipment, UCI bits to be transmitted are processed according to the comparison of M and N with P and/or Q in accordance with the UCI multiplexing rule.

In addition, the control information may also include resouce allocation information. Then, the demodulating and decoding section 715 outputs the resouce allocation information within the control information to the demapping unit 716.

Based on the resouce allocation information input from the demodulating and decoding section 715, the demapping section 716 extracts a data symbol from PRBs based on the resource allocation information. Then, the demapping unit 716 outputs the extracted data symbol to a demodulating and decoding section 717.

In the demodulating and decoding section 717, a demodulating unit 703 performs demodulation processing on a data symbol input from the demapping unit 716, and a decoding unit 704 performs decoding processing on the post-demodulation signal. By this means, received data is obtained.

Meanwhile, in an encoding and modulating section 718, an encoding unit 705 performs encoding processing on transmission data, and a modulating unit 706 performs modulation processing on post-encoding transmission data to generate a data symbol. An IFFT unit 719 performs IFFT processing on a plurality of subcarriers in PRBs to which a data symbol input from the encoding and modulating section 718 is allocated, to generate an OFDM symbol that is a multicarrier signal. A CP adding unit 720 adds a signal identical to the end part of an OFDM symbol to the start of the OFDM symbol as a CP. A radio transmission unit 721 performs transmission processing such as D/A conversion, amplification, and up-conversion on a post-CP-addition OFDM symbol, and transmits it to a user equipment from the antenna 710.

Apparently, although not shown in FIG. 7, BS 700 may also transmit DCI to a user equipment by means of the encoding and modulating section 718, the IFFT unit 719, the CP adding unit 720, the CP adding unit 720 and the antenna 710.

Note that, the base station 700 shown in FIG. 7 may function as BS 500 as shown in FIG. 5. Specifically, the radio reception unit 711 may correspond to the receiver 510. The circuitry 520 may include the CP removal unit 712, the FFT unit 713, demultiplexing unit 714, the demodulating and decoding sections 715, 717, the demapping unit 716, the encoding and modulating section 718, the IFFT unit 719, the CP adding unit 720. Apparently, one or more of these units may also be separated from the circuitry 520 depending on specific requirements.

As well known in the related art, both Cyclic Prefix-Orthogonal Frequency Division Multiplexing (CP-OFDM) waveform and Discrete Fourier Transform-spread-Orthogonal Frequency Division Multiplexing (DFT-S-OFDM) waveform are supported for uplink in NR currently. Different waveforms will impact the mapping of UCI in NR. The principles of DFT-S-OFDM and CP-OFDM are well known in the related art and thus will not be explained in detail herein. The main difference of them is whether additional DFT operation is present or not. For example, FIGS. 6 and 7 in the above give a case that PUSCH employs CP-OFDM waveform (there is no additional DFT operation therein), however, the present disclosure is not limited thereto. Apparently, the present disclosure may also be applied to a case that PUSCH employs DFT-S-OFDM waveform.

Figure 8:
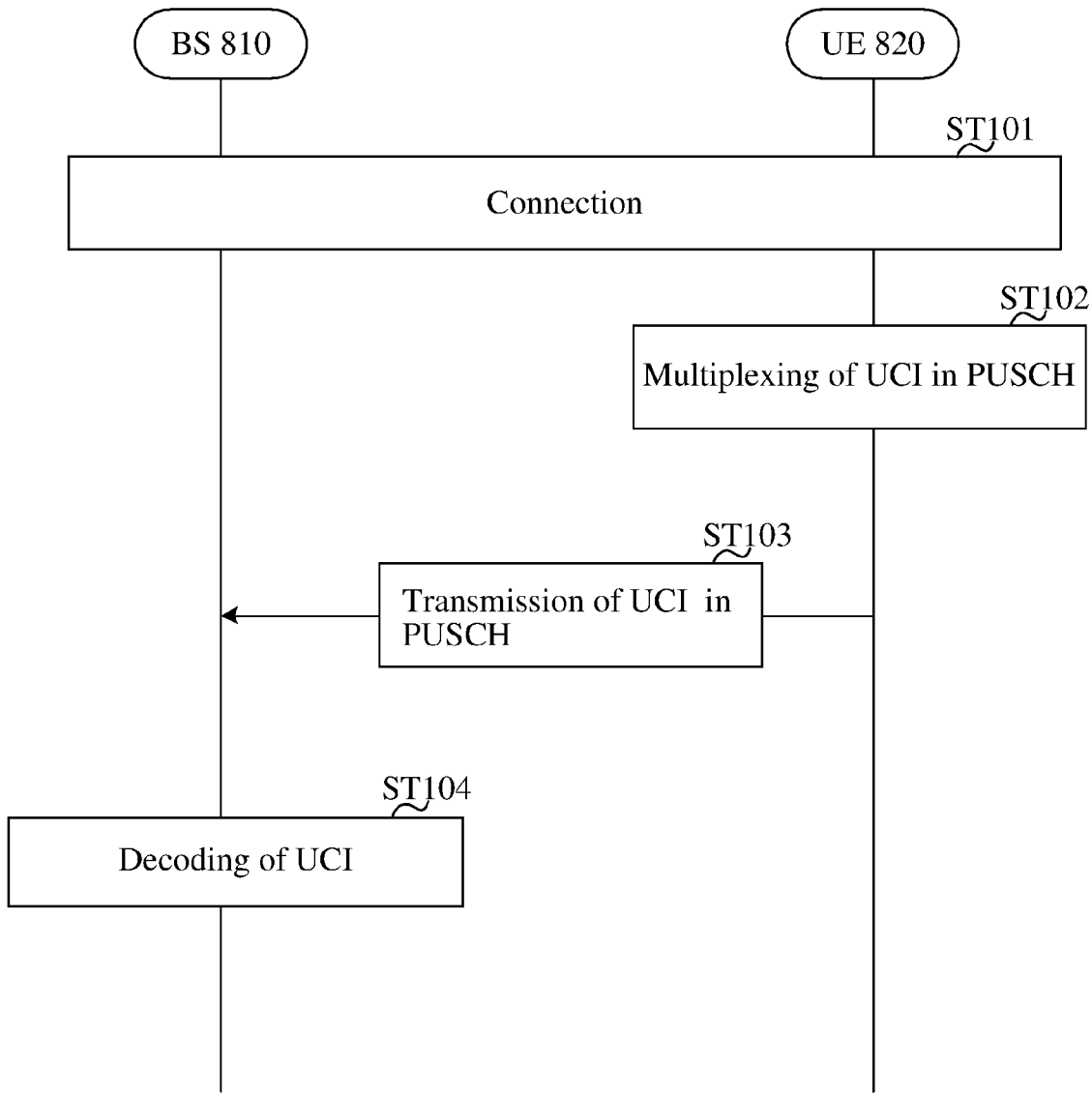
FIG. 8 schematically shows an example of a flowchart of communication between a base station and a user equipment according to an embodiment of the present disclosure.

FIG. 8 schematically shows an example of a flowchart of communication between a BS 810 and a UE 820 according to an embodiment of the present disclosure. For example, the BS 810 may be the BS 500 as shown in FIG. 5 or the base station 700 shown in FIG. 7, and the UE 820 may be the UE 200 as shown in FIG. 2 or the user equipment 600 shown in FIG. 6.

At a step ST101, the UE 820 connects with the BS 810 in a connection procedure. The connection may be established by implementing known or future developed method whose details are omitted herein.

At a step ST102, the UE 820 performs multiplexing of UCI in PUSCH. More specifically, UE 820 processes UCI bits to be transmitted according to the comparison of M and N with P and/or Q. As described above, the UE 820 may include the circuitry 210 as the UE 200 shown in FIG. 2, and the step ST102 may be performed by the circuitry 210.

At a step ST103, the UE 820 transmits the UCI bits in PUSCH to the BS 810. As described above, the UE 820 may also include the transmitter 220 as the UE 200 shown in FIG. 2, and the step ST103 may be performed by the transmitter 220. Correspondingly, BS 810 may include the receiver 510 as the BS 500 as shown in FIG. 5, and the receiver 510 receives UCI bits transmitted from the UE 820 at the step ST103.

At a step ST104, the BS 810 decodes UCI bits in accordance with a UCI multiplexing rule which indicates how to process UCI bits to be transmitted. The BS 810 may also include the circuitry 520 as the BS 500 shown in FIG. 5, and the step ST104 may be performed by the circuitry 520.

It is noted that, although not shown in FIG. 8, data may be transmitted in PUSCH from the UE 820 to the BS 810 and then be decoded at the BS 810.

Figure 9:
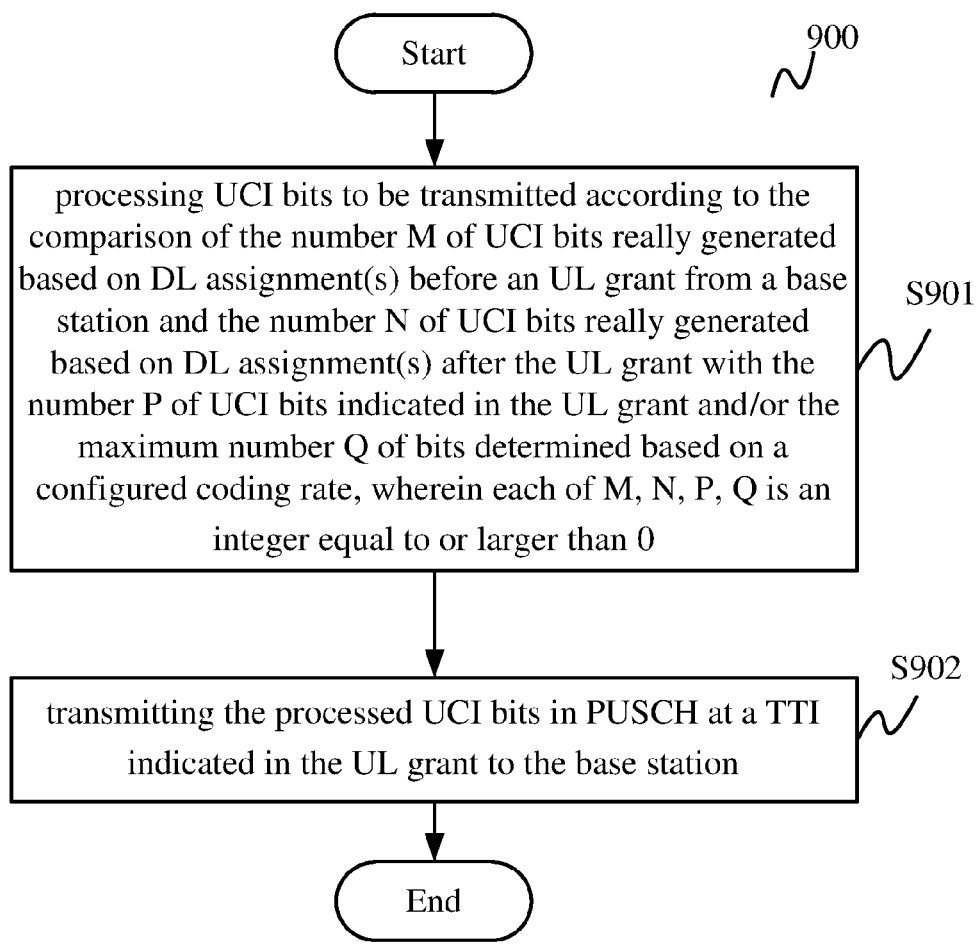
FIG. 9 illustrates a flowchart of a wireless communication method for a user equipment according to an embodiment of the present disclosure.

In a further embodiment of the present disclosure, there is provided a wireless communication method for a user equipment as shown in FIG. 9. FIG. 9 illustrates a flowchart of a wireless communication method 900 for a user equipment according to an embodiment of the present disclosure. For example, the wireless communication method 900 may be applied to the UE 200/600 as shown in FIGS. 2 and 6.

As shown in FIG. 9, the wireless communication method 900 starts at a step S901 in which Uplink Control Information (UCI) bits to be transmitted are processed according to the comparison of the number M of UCI bits generated based on Downlink (DL) assignment(s) before an Uplink (UL) grant from a base station and the number N of UCI bits generated based on DL assignment(s) after the UL grant with the number P of UCI bits indicated in the UL grant and/or the maximum number Q of bits determined based on at least a configured coding rate, wherein each of M, N, P, Q is an integer equal to or larger than 0. Then, at a step S902, the processed UCI bits are transmitted in Physical Uplink Shared Channel (PUSCH) at a Transmission Time Interval (TTI) indicated in the UL grant to the base station. After the step S902, the wireless communication method 900 is ended. For example, the base station may be BS 500/700 as shown in FIGS. 5 and 7.

With the wireless communication method 900, by further multiplexing of UCI bits corresponding to DL assignment(s) after the UL grant in PUSCH, the user throughput may be increased and the system performance may be improved.

Note that, the other technical features in the user equipment 200 as described above can also be incorporated in the wireless communication method 900 and will not be described here for avoiding redundancy.

Figure 10:
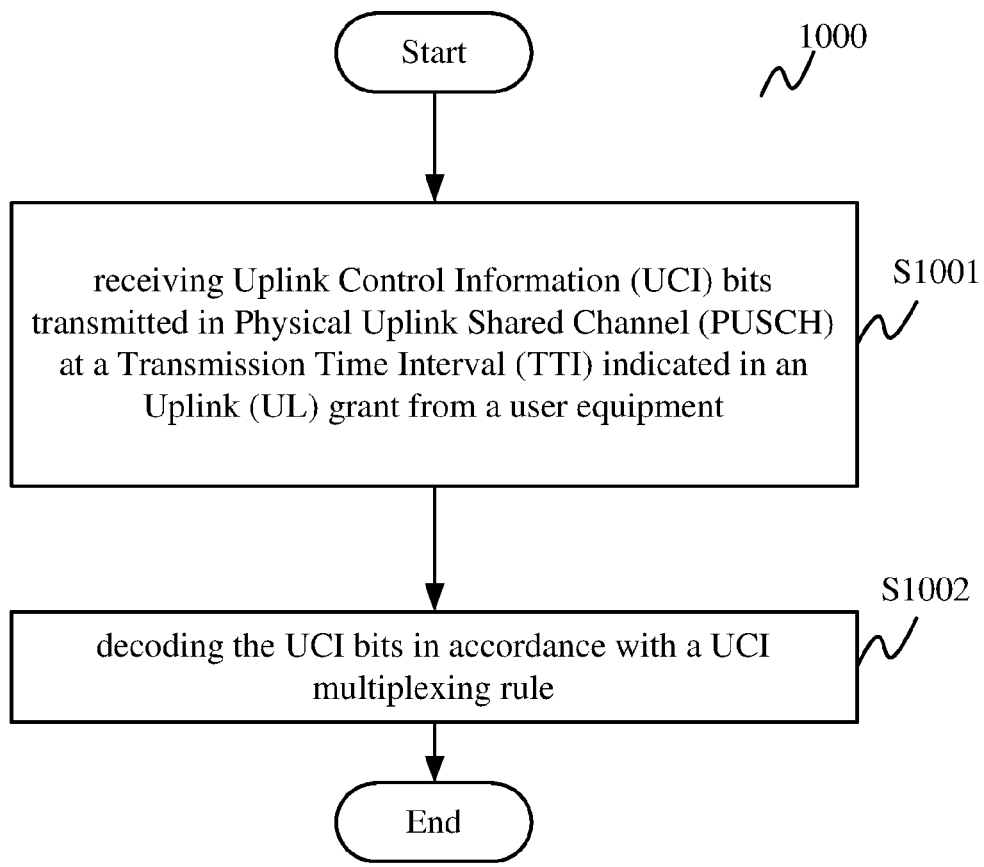
FIG. 10 illustrates a flowchart of a wireless communication method for a base station according to an embodiment of the present disclosure.

In a further embodiment of the present disclosure, there is provided a wireless communication method for a base station as shown in FIG. 10. FIG. 10 illustrates a flowchart of a wireless communication method 1000 for a base station according to an embodiment of the present disclosure. For example, the wireless communication method 1000 may be applied to the BS 500/700 as shown in FIGS. 5 and 7.

As shown in FIG. 10, the wireless communication method 1000 starts at a step S1001 in which Uplink Control Information (UCI) bits transmitted in Physical Uplink Shared Channel (PUSCH) are received at a Transmission Time Interval (TTI) indicated in an Uplink (UL) grant from a user equipment. Then, at a step S1002, the UCI bits are decoded in accordance with a UCI multiplexing rule. After the step S1002, the wireless communication method 1000 is ended. The UCI bits before transmission is processed at the user equipment according to the comparison of the number M of UCI bits generated based on Downlink (DL) assignment(s) before the UL grant from the base station and the number N of UCI bits generated based on DL assignment(s) after the UL grant with the number P of UCI bits indicated in the UL grant and/or the maximum number Q of bits determined based on at least a configured coding rate in accordance with the UCI multiplexing rule, wherein each of M, N, P, Q is an integer equal to or larger than 0. For example, the user equipment may be the UE 200/600 as shown in FIGS. 2 and 6.

With the wireless communication method 1000, by further multiplexing of UCI bits corresponding to DL assignment(s) after the UL grant in PUSCH, the user throughput may be increased and the system performance may be improved.

Note that, the other technical features in the base station 500 as described above can also be incorporated in the wireless communication method 1000 and will not be described here for avoiding redundancy.

Although the above description focuses on multiplexing of UCI in PUSCH, the present disclosure is not limited thereto. As described in BACKGROUND, UCI may also be transmitted in PUCCH. Accordingly, the idea disclosed hereinabove may also be applied to multiplexing of UCI in PUCCH. For example, when there are no enough resources in PUCCH to transmit all of UCI bits to be transmitted in PUCCH, bundling may be performed on some of UCI bits to reduce the total number of UCI bits to be transmitted in PUCCH. Apparently, consideration on how to perform bundling as discussed for cases of PUSCH in the above is also applicable to cases of PUCCH.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A user equipment, comprising:
  circuitry operative to process Uplink Control Information (UCI) bits to be transmitted according to the comparison of the number M of UCI bits generated based on Downlink (DL) assignment(s) before an Uplink (UL) grant from a base station and the number N of UCI bits generated based on DL assignment(s) after the UL grant with the number P of UCI bits indicated in the UL grant and/or the maximum number Q of bits determined based on at least a configured coding rate, wherein each of M, N, P, Q is an integer equal to or larger than 0; and a transmitter operative to transmit the processed UCI bits in Physical Uplink Shared Channel (PUSCH) at a Transmission Time Interval (TTI) indicated in the UL grant to the base station.

(2). The user equipment according to (1), wherein when $(M+N) \leq P$, the circuitry
  multiplexes the N UCI bits with the M UCI bits together without any compression, when $M<P<(M+N)$, the circuitry bundles the N UCI bits into (N−X1) UCI bits, bundles the M UCI bits into (M−X2) UCI bits and multiplexes the (N−X1) UCI bits with the (M−X2) UCI bits together, wherein (X1+X2)=M+N−P in which both X1 and X2 are integers equal to or larger than 0, and
  when $P \leq M$, the circuitry bundles the N UCI bits into (N−Y1) UCI bits, bundles the M UCI bits into (M−Y2) UCI bits and multiplexes the (N−Y1) UCI bits with the (M−Y2) UCI bits together, wherein (Y1+Y2)=M+N−P in which both Y1 and Y2 are integers larger than 0.

(3). The user equipment according to (1), wherein when $(M+N) \leq Q$, the circuitry multiplexes the N UCI bits with the M UCI bits together without any compression, and
  when $Q<(M+N)$, the circuitry bundles the N UCI bits into (N−Z1) UCI bits, bundles the M UCI bits into (M−Z2) UCI bits and multiplexes the (N−Z1) UCI bits with the (M−Z2) UCI bits together, wherein $(Z1+Z2) \geq M+N-Q$ in which both Z1 and Z2 are integers equal to or larger than 0.

(4). The user equipment according to (1), wherein the configured coding rate is the maximum coding rate of the UCI bits, and Q is determined based on the maximum coding rate of the UCI bits, an assumed resource size and an assumed modulation order.

(5). The user equipment according to (4), wherein the assumed resource size is the whole assigned PUSCH resource excluding Resource Elements (REs) for Reference Signals (RSs), is determined based on the indication in Downlink Control Information for UL assignment and semi-static configuration, or is determined based on semi-static configuration only.

(6). The user equipment according to (4), wherein the maximum coding rate of the UCI bits is separately configured for UCI multiplexing of PUSCH and that of Physical Uplink Control Channel (PUCCH) but Radio Resource Control (RRC) parameter set is common for PUSCH and PUCCH.

(7). The user equipment according to (4), wherein the assumed modulation order is the same as that of PUSCH.

(8). The user equipment according to (1), wherein when $P<(M+N) \leq Q$, the circuitry multiplexes the N UCI bits with the M UCI bits together without any compression.

(9). The user equipment according to (1), wherein the UCI bits are used for a first UCI, and wherein
  when a transmitted coding rate of the first UCI considering DL assignment(s) after the UL grant minus a transmitted coding rate of the first UCI not considering DL assignment(s) after the UL grant is higher than a predetermined value, the circuitry pre-empts resources used for a second UCI of a priority lower than that of the first UCI in PUSCH to provide additional bits for the first UCI.

(10). The user equipment according to (9), wherein the circuitry pre-empts resources used for the second UCI in PUSCH by bundling and/or dropping the second UCI, and
  wherein dropping the second UCI comprising one of:
    dropping some REs for the second UCI without changing the coding rate of the second UCI;
    changing the coding rate of the second UCI to leave some REs to be used for the first UCI; and
    dropping all of REs for the second UCI.

(11). The user equipment according to (9), wherein the predetermined value is configured or specified in the standard.

(12). The user equipment according to (9), wherein the first UCI is Hybrid Automatic Repeat request-Acknowledgement (HARQ-ACK) and the second UCI is Channel State Information (CSI).

(13). The user equipment according to any one of (2)-(3) and (10), wherein the bundling is performed in spatial domain first and then in frequency domain and finally in time domain, or performed in spatial domain first and then in time domain and finally in frequency domain, which is based on RRC configuration or specified in the standard.

(14). The user equipment according to (1), wherein the UCI bits are used for one of HARQ-ACK, CSI part 1 and CSI part 2, and
  wherein the coding rate for each of HARQ-ACK, CSI part 1 and CSI part 2 is separately configured.

(15). A base station, comprising:
 a receiver operative to receive Uplink Control Information (UCI) bits transmitted in Physical Uplink Shared Channel (PUSCH) at a Transmission Time Interval (TTI) indicated in an Uplink (UL) grant from a user equipment; and
 circuitry operative to decode the UCI bits in accordance with a UCI multiplexing rule,
 wherein the UCI bits before transmission is processed at the user equipment according to the comparison of the number M of UCI bits generated based on Downlink (DL) assignment(s) before the UL grant from the base station and the number N of UCI bits generated based on DL assignment(s) after the UL grant with the number P of UCI bits indicated in the UL grant and/or the maximum number Q of bits determined based on at least a configured coding rate in accordance with the UCI multiplexing rule, wherein each of M, N, P, Q is an integer equal to or larger than 0.

(16). The base station according to (15), wherein in accordance with the UCI multiplexing rule,
 when (M+N)≤P, the N UCI bits are multiplexed with the M UCI bits together without any compression at the user equipment,
 when M<P<(M+N), the N UCI bits are bundled into (N−X1) UCI bits, the M UCI bits are bundled into (M−X2) UCI bits and the (N−X1) UCI bits are multiplexed with the (M−X2) UCI bits together at the user equipment, wherein (X1+X2)=M+N−P in which both X1 and X2 are integers equal to or larger than 0, and
 when P≤M, the N UCI bits are bundled into (N−Y1) UCI bits, the M UCI bits are bundled into (M−Y2) UCI bits and the (N−Y1) UCI bits are multiplexed with the (M−Y2) UCI bits together at the user equipment, wherein (Y1+Y2)=M+N−P in which both Y1 and Y2 are integers larger than 0.

(17). The base station according to (15), wherein in accordance with the UCI multiplexing rule,
 when (M+N)≤Q, the N UCI bits are multiplexed with the M UCI bits together without any compression at the user equipment, and
 when Q<(M+N), the N UCI bits are bundled into (N−Z1) UCI bits, the M UCI bits are bundled into (M−Z2) UCI bits and the (N−Z1) UCI bits are multiplexed with the (M−Z2) UCI bits together at the user equipment, wherein (Z1+Z2)≥M+N−Q in which both Z1 and Z2 are integers equal to or larger than 0.

(18). The base station according to (15), wherein the configured coding rate is the maximum coding rate of the UCI bits, and Q is determined based on the maximum coding rate of the UCI bits, an assumed resource size and an assumed modulation order.

(19). The base station according to (18), wherein the assumed resource size is the whole assigned PUSCH resource excluding Resource Elements (REs) for Reference Signals (RSs), is determined based on the indication in Downlink Control Information for UL assignment and semi-static configuration, or is determined based on semi-static configuration only.

(20). The base station according to (18), wherein the maximum coding rate of the UCI bits is separately configured for UCI multiplexing of PUSCH and that of Physical Uplink Control Channel (PUCCH) but Radio Resource Control (RRC) parameter set is common for PUSCH and PUCCH.

(21). The base station according to (18), wherein the assumed modulation order is the same as that of PUSCH.

(22). The base station according to (15), wherein when P<(M+N)≤Q, the N UCI bits are multiplexed with the M UCI bits together without any compression at the user equipment in accordance with the UCI multiplexing rule.

(23). The base station according to (15), wherein the UCI bits are used for a first UCI, and wherein
 when a transmitted coding rate of the first UCI considering DL assignment(s) after the UL grant minus a transmitted coding rate of the first UCI not considering DL assignment(s) after the UL grant is higher than a predetermined value, resources used for a second UCI of a priority lower than that of the first UCI in PUSCH are pre-empted to provide additional bits for the first UCI at the user equipment in accordance with the UCI multiplexing rule.

(24). The base station according to (23), wherein resources used for the second UCI in PUSCH are pre-empted at the user equipment by bundling and/or dropping the second UCI in accordance with the UCI multiplexing rule, and
 wherein dropping the second UCI comprising one of:
 dropping some REs for the second UCI without changing the coding rate of the second UCI;
 changing the coding rate of the second UCI to leave some REs to be used for the first UCI; and
 dropping all of REs for the second UCI.

(25). The base station according to (23), wherein the predetermined value is configured or specified in the standard.

(26). The base station according to (23), wherein the first UCI is Hybrid Automatic Repeat request-Acknowledgement (HARQ-ACK) and the second UCI is Channel State Information (CSI).

(27). The base station according to any one of (16)-(17) and (24), wherein the bundling is performed in spatial domain first and then in frequency domain and finally in time domain, or performed in spatial domain first and then in time domain and finally in frequency domain, which is based on RRC configuration or specified in the standard.

(28). The base station according to (15), wherein the UCI bits are used for one of HARQ-ACK, CSI part 1 and CSI part 2, and
 wherein the coding rate for each of HARQ-ACK, CSI part 1 and CSI part 2 is separately configured.

(29). A wireless communication method for a user equipment, comprising:
 processing Uplink Control Information (UCI) bits to be transmitted according to the comparison of the number M of UCI bits generated based on Downlink (DL) assignment(s) before an Uplink (UL) grant from a base station and the number N of UCI bits generated based on DL assignment(s) after the UL grant with the number P of UCI bits indicated in the UL grant and/or the maximum number Q of bits determined based on at least a configured coding rate, wherein each of M, N, P, Q is an integer equal to or larger than 0; and
 transmitting the processed UCI bits in Physical Uplink Shared Channel (PUSCH) at a Transmission Time Interval (TTI) indicated in the UL grant to the base station.

(30). The wireless communication method according to (29), wherein processing Uplink Control Information (UCI) bits to be transmitted comprises:
when $(M+N) \leq P$, multiplexing the N UCI bits with the M UCI bits together without any compression,
when $M<P<(M+N)$, bundling the N UCI bits into (N−X1) UCI bits, bundling the M UCI bits into (M−X2) UCI bits and multiplexing the (N−X1) UCI bits with the (M−X2) UCI bits together, wherein $(X1+X2)=M+N-P$ in which both X1 and X2 are integers equal to or larger than 0, and
when $P \leq M$, bundling the N UCI bits into (N−Y1) UCI bits, bundling the M UCI bits into (M−Y2) UCI bits and multiplexing the (N−Y1) UCI bits with the (M−Y2) UCI bits together, wherein $(Y1+Y2)=M+N-P$ in which both Y1 and Y2 are integers larger than 0.

(31). The wireless communication method according to (29), wherein processing Uplink Control Information (UCI) bits to be transmitted comprises:
when $(M+N) \leq Q$, multiplexing the N UCI bits with the M UCI bits together without any compression, and
when $Q<(M+N)$, bundling the N UCI bits into (N−Z1) UCI bits, bundling the M UCI bits into (M−Z2) UCI bits and multiplexing the (N−Z1) UCI bits with the (M−Z2) UCI bits together, wherein $(Z1+Z2) \geq M+N-Q$ in which both Z1 and Z2 are integers equal to or larger than 0.

(32). The wireless communication method according to (29), wherein the configured coding rate is the maximum coding rate of the UCI bits, and Q is determined based on the maximum coding rate of the UCI bits, an assumed resource size and an assumed modulation order.

(33). The wireless communication method according to (32), wherein the assumed resource size is the whole assigned PUSCH resource excluding Resource Elements (REs) for Reference Signals (RSs), is determined based on the indication in Downlink Control Information for UL assignment and semi-static configuration, or is determined based on semi-static configuration only.

(34). The wireless communication method according to (32), wherein the maximum coding rate of the UCI bits is separately configured for UCI multiplexing of PUSCH and that of Physical Uplink Control Channel (PUCCH) but Radio Resource Control (RRC) parameter set is common for PUSCH and PUCCH.

(35). The wireless communication method according to (32), wherein the assumed modulation order is the same as that of PUSCH.

(36). The wireless communication method according to (29), wherein processing Uplink Control Information (UCI) bits to be transmitted comprises:
when $P<(M+N) \leq Q$, multiplexing the N UCI bits with the M UCI bits together without any compression.

(37). The wireless communication method according to (29), wherein the UCI bits are used for a first UCI, and wherein processing Uplink Control Information (UCI) bits to be transmitted comprises:
when a transmitted coding rate of the first UCI considering DL assignment(s) after the UL grant minus a transmitted coding rate of the first UCI not considering DL assignment(s) after the UL grant is higher than a predetermined value, pre-empting resources used for a second UCI of a priority lower than that of the first UCI in PUSCH to provide additional bits for the first UCI.

(38). The wireless communication method according to (37), wherein resources used for the second UCI in PUSCH are pre-empted by bundling and/or dropping the second UCI, and
wherein dropping the second UCI comprising one of:
dropping some REs for the second UCI without changing the coding rate of the second UCI;
changing the coding rate of the second UCI to leave some REs to be used for the first UCI; and
dropping all of REs for the second UCI.

(39). The wireless communication method according to (37), wherein the predetermined value is configured or specified in the standard.

(40). The wireless communication method according to (37), wherein the first UCI is Hybrid Automatic Repeat request-Acknowledgement (HARQ-ACK) and the second UCI is Channel State Information (CSI).

(41). The wireless communication method according to any one of (30)-(31) and (38), wherein the bundling is performed in spatial domain first and then in frequency domain and finally in time domain, or performed in spatial domain first and then in time domain and finally in frequency domain, which is based on RRC configuration or specified in the standard.

(42). The wireless communication method according to (29), wherein the UCI bits are used for one of HARQ-ACK, CSI part 1 and CSI part 2, and
wherein the coding rate for each of HARQ-ACK, CSI part 1 and CSI part 2 is separately configured.

(43). A wireless communication method for a base station, comprising:
receiving Uplink Control Information (UCI) bits transmitted in Physical Uplink Shared Channel (PUSCH) at a Transmission Time Interval (TTI) indicated in an Uplink (UL) grant from a user equipment; and
decoding the UCI bits in accordance with a UCI multiplexing rule,
wherein the UCI bits before transmission is processed at the user equipment according to the comparison of the number M of UCI bits generated based on Downlink (DL) assignment(s) before the UL grant from the base station and the number N of UCI bits generated based on DL assignment(s) after the UL grant with the number P of UCI bits indicated in the UL grant and/or the maximum number Q of bits determined based on at least a configured coding rate in accordance with the UCI multiplexing rule,
wherein each of M, N, P, Q is an integer equal to or larger than 0.

(44). The wireless communication method according to (43), wherein in accordance with the UCI multiplexing rule,
when $(M+N) \leq P$, the N UCI bits are multiplexed with the M UCI bits together without any compression at the user equipment,
when $M<P<(M+N)$, the N UCI bits are bundled into (N−X1) UCI bits, the M UCI bits are bundled into (M−X2) UCI bits and the (N−X1) UCI bits are multiplexed with the (M−X2) UCI bits together at the user equipment, wherein $(X1+X2)=M+N-P$ in which both X1 and X2 are integers equal to or larger than 0, and
when $P<M$, the N UCI bits are bundled into (N−Y1) UCI bits, the M UCI bits are bundled into (M−Y2) UCI bits and the (N−Y1) UCI bits are multiplexed with the (M−Y2) UCI bits together at the user equipment, wherein (Y1+Y2)=M+N−P in which both Y1 and Y2 are integers larger than 0.

(45). The wireless communication method according to (43), wherein in accordance with the UCI multiplexing rule,
when (M+N)≤Q, the N UCI bits are multiplexed with the M UCI bits together without any compression at the user equipment, and
when Q<(M+N), the N UCI bits are bundled into (N−Z1) UCI bits, the M UCI bits are bundled into (M−Z2) UCI bits and the (N−Z1) UCI bits are multiplexed with the (M−Z2) UCI bits together at the user equipment, wherein (Z1+Z2)≥M+N−Q in which both Z1 and Z2 are integers equal to or larger than 0.

(46). The wireless communication method according to (43), wherein the configured coding rate is the maximum coding rate of the UCI bits, and Q is determined based on the maximum coding rate of the UCI bits, an assumed resource size and an assumed modulation order.

(47). The wireless communication method according to (46), wherein the assumed resource size is the whole assigned PUSCH resource excluding Resource Elements (REs) for Reference Signals (RSs), is determined based on the indication in Downlink Control Information for UL assignment and semi-static configuration, or is determined based on semi-static configuration only.

(48). The wireless communication method according to (46), wherein the maximum coding rate of the UCI bits is separately configured for UCI multiplexing of PUSCH and that of Physical Uplink Control Channel (PUCCH) but Radio Resource Control (RRC) parameter set is common for PUSCH and PUCCH.

(49). The wireless communication method according to (46), wherein the assumed modulation order is the same as that of PUSCH.

(50). The wireless communication method according to (43), wherein when P<(M+N)≤Q, the N UCI bits are multiplexed with the M UCI bits together without any compression at the user equipment in accordance with the UCI multiplexing rule.

(51). The wireless communication method according to (43), wherein the UCI bits are used for a first UCI, and wherein
when a transmitted coding rate of the first UCI considering DL assignment(s) after the UL grant minus a transmitted coding rate of the first UCI not considering DL assignment(s) after the UL grant is higher than a predetermined value, resources used for a second UCI of a priority lower than that of the first UCI in PUSCH are pre-empted to provide additional bits for the first UCI at the user equipment in accordance with the UCI multiplexing rule.

(52). The wireless communication method according to (51), wherein resources used for the second UCI in PUSCH are pre-empted at the user equipment by bundling and/or dropping the second UCI in accordance with the UCI multiplexing rule, and
wherein dropping the second UCI comprising one of:
dropping some REs for the second UCI without changing the coding rate of the second UCI;
changing the coding rate of the second UCI to leave some REs to be used for the first UCI; and
dropping all of REs for the second UCI.

(53). The wireless communication method according to (51), wherein the predetermined value is configured or specified in the standard.

(54). The wireless communication method according to (51), wherein the first UCI is Hybrid Automatic Repeat request-Acknowledgement (HARQ-ACK) and the second UCI is Channel State Information (CSI).

(55). The wireless communication method according to any one of (44)-(45) and (52), wherein the bundling is performed in spatial domain first and then in frequency domain and finally in time domain, or performed in spatial domain first and then in time domain and finally in frequency domain, which is based on RRC configuration or specified in the standard.

(56). The wireless communication method according to (43), wherein the UCI bits are used for one of HARQ-ACK, CSI part 1 and CSI part 2, and wherein the coding rate for each of HARQ-ACK, CSI part 1 and CSI part 2 is separately configured.

The invention claimed is:

1. A base station, comprising:
a receiver operative to receive Uplink Control Information (UCI) bits transmitted in a Physical Uplink Shared Channel (PUSCH) at a Transmission Time Interval (TTI) indicated in an Uplink (UL) grant from a user equipment; and
circuitry operative to decode the UCI bits in accordance with a UCI multiplexing rule,
wherein the UCI bits before transmission are processed at the user equipment according to a comparison of a number M of UCI bits generated based on Downlink (DL) assignment(s) before the UL grant and a number N of UCI bits generated based on DL assignment(s) after the UL grant with a number P of UCI bits indicated in the UL grant and/or a maximum number Q of bits determined based on at least a configured coding rate, each of M, N, P, and Q being an integer equal to or larger than 0, and
wherein the processed UCI bits are used for a first UCI, and when a transmitted coding rate of the first UCI considering the DL assignment(s) after the UL grant minus a transmitted coding rate of the first UCI not considering the DL assignment(s) after the UL grant is higher than a predetermined value, resources used for a second UCI of a priority lower than that of the first UCI are preempted in the PUSCH to provide additional bits for the first UCI.

2. The base station according to claim 1, wherein
when (M+N)≤P, the N UCI bits are multiplexed with the M UCI bits together without any compression,
when M<P<(M+N), the N UCI bits are bundled into (N−X1) UCI bits, the M UCI bits are bundled into (M−X2) UCI bits and the (N−X1) UCI bits are multiplexed with the (M−X2) UCI bits together, wherein (X1+X2)=M+N−P in which both X1 and X2 are integers equal to or larger than 0, and
when P≤M, the N UCI bits are bundled into (N−Y1) UCI bits, the M UCI bits are bundled into (M−Y2) UCI bits and the (N−Y1) UCI bits are multiplexed with the (M−Y2) UCI bits together, wherein (Y1+Y2)=M+N−P in which both Y1 and Y2 are integers larger than 0.

3. The base station according to claim 1, wherein
when (M+N)≤Q, the N UCI bits are multiplexed with the M UCI bits together without any compression, and
when Q<(M+N), the N UCI bits are bundled into (N−Z1) UCI bits, the M UCI bits are bundled into (M−Z2) UCI bits and the (N−Z1) UCI bits are multiplexed with the (M−Z2) UCI bits together, wherein (Z1+Z2)≥M+N−Q in which both Z1 and Z2 are integers equal to or larger than 0.

4. The base station according to claim 1, wherein the resources used for the second UCI are preempted in the PUSCH by bundling and/or dropping the second UCI, and wherein dropping the second UCI includes one of:
dropping some resource elements (REs) for the second UCI without changing a coding rate of the second UCI;
changing the coding rate of the second UCI to leave some REs to be used for the first UCI; and
dropping all REs for the second UCI.

5. The base station according to claim 1, wherein the first UCI is a Hybrid Automatic Repeat request-Acknowledgement (HARQ-ACK) and the second UCI is a Channel State Information (CSI).

6. The base station according to claim 2, wherein the bundling is performed in a spatial domain first and then in a frequency domain and finally in a time domain, or the bundling performed in the spatial domain first and then in the time domain and finally in the frequency domain, which is based on a radio resource control (RRC) configuration or specified in a standard.

7. The base station according to claim 1, wherein
the UCI bits are used for one of HARQ-ACK, CSI part 1 and CSI part 2, and
wherein the coding rate for each of HARQ-ACK, CSI part 1 and CSI part 2 is separately configured.

8. A wireless communication method, comprising:
receiving Uplink Control Information (UCI) bits transmitted in a Physical Uplink Shared Channel (PUSCH) at a Transmission Time Interval (TTI) indicated in an Uplink (UL) grant from a user equipment; and
decoding the UCI bits in accordance with a UCI multiplexing rule,
wherein the UCI bits before transmission are processed at the user equipment according to a comparison of a number M of UCI bits generated based on Downlink (DL) assignment(s) before the UL grant and a number N of UCI bits generated based on DL assignment(s) after the UL grant with a number P of UCI bits indicated in the UL grant and/or a maximum number Q of bits determined based on at least a configured coding rate, each of M, N, P, and Q being an integer equal to or larger than 0, and
wherein the processed UCI bits are used for a first UCI, and when a transmitted coding rate of the first UCI considering the DL assignment(s) after the UL grant minus a transmitted coding rate of the first UCI not considering the DL assignment(s) after the UL grant is higher than a predetermined value, resources used for a second UCI of a priority lower than that of the first UCI are preempted in the PUSCH to provide additional bits for the first UCI.

* * * * *